US011418300B2

United States Patent
Ibars Casas et al.

(10) Patent No.: US 11,418,300 B2
(45) Date of Patent: Aug. 16, 2022

(54) CO-EXISTENCE OF ORTHOGONAL TIME FREQUENCY SPACE AND LONG TERM EVOLUTION SYSTEMS

(71) Applicant: Cohere Technologies, Inc., Santa Clara, CA (US)

(72) Inventors: Christian Ibars Casas, Santa Clara, CA (US); James Delfeld, Santa Clara, CA (US); Yoav Hebron, Santa Clara, CA (US); Shachar Kons, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/251,960

(22) PCT Filed: Jun. 12, 2019

(86) PCT No.: PCT/US2019/036842
§ 371 (c)(1),
(2) Date: Dec. 14, 2020

(87) PCT Pub. No.: WO2019/241436
PCT Pub. Date: Dec. 19, 2019

(65) Prior Publication Data
US 2021/0250138 A1    Aug. 12, 2021

Related U.S. Application Data

(60) Provisional application No. 62/685,242, filed on Jun. 14, 2018.

(51) Int. Cl.
*H04L 5/00* (2006.01)
*H04L 27/26* (2006.01)
(Continued)

(52) U.S. Cl.
CPC ......... *H04L 5/0023* (2013.01); *H04B 7/0456* (2013.01); *H04L 27/2603* (2021.01);
(Continued)

(58) Field of Classification Search
CPC .............. H04L 5/0023; H04L 27/2603; H04L 27/2639; H04B 7/0456; H04W 4/06; H04W 72/0406
See application file for complete search history.

(56) References Cited

U.S. PATENT DOCUMENTS 10,547,476 B2 * 1/2020 Ashrafi ................. H04L 27/362
2003/0133469 A1 * 7/2003 Brockmann .......... H04L 5/1438
370/445

(Continued)

FOREIGN PATENT DOCUMENTS

WO    2017/049303 A1    3/2017

OTHER PUBLICATIONS

International Search Report and Written Opinion for PCT/US19/036842, dated Sep. 16, 2019, 11 pages.

(Continued)

*Primary Examiner* — Rhonda L Murphy
(74) *Attorney, Agent, or Firm* — Perkins Coie LLP

(57) ABSTRACT

Co-existence between an Orthogonal Time Frequency Space (OTFS) modulation system and a Long Term Evolution (LTE) system is achieved by generating a number of transmission beams for a first group of user equipment operating using LTE, and a second group of user equipment operating using the OTFS protocol, and transmitting a first group of data packets formatted according to the LTE protocol to the first group of user equipment and a second group of data packets formatted according to the OTFS protocol to the second group of user equipment. The transmissions are performed by precoding and modulating the first group of
(Continued)

data packets according to an LTE modulation scheme, and precoding and modulating the second group of data packets according to an OTFS modulation scheme.

12 Claims, 34 Drawing Sheets

(51) Int. Cl.
H04B 7/0456 (2017.01)
H04W 4/06 (2009.01)
H04W 72/04 (2009.01)

(52) U.S. Cl.
CPC .......... *H04L 27/2639* (2013.01); *H04W 4/06* (2013.01); *H04W 72/0406* (2013.01)

(56) References Cited

U.S. PATENT DOCUMENTS

| | | | |
|---|---|---|---|
| 2011/0249611 A1* | 10/2011 | Khandekar | H04B 7/155 370/315 |
| 2014/0204913 A1* | 7/2014 | Hu | H04L 25/0224 370/335 |
| 2014/0269502 A1* | 9/2014 | Forenza | H04B 17/12 370/328 |
| 2015/0249487 A1 | 9/2015 | Harel et al. | |
| 2017/0012479 A1 | 1/2017 | Yi | |
| 2017/0033899 A1 | 2/2017 | Rakib et al. | |
| 2017/0339646 A1* | 11/2017 | Caretti | H04W 52/244 |
| 2019/0261368 A1* | 8/2019 | Opshaug | H04L 5/0041 |
| 2019/0268113 A1* | 8/2019 | Lee | H04L 27/2672 |
| 2019/0357186 A1* | 11/2019 | Feng | H04L 5/001 |
| 2020/0028640 A1* | 1/2020 | Yeo | H04L 5/005 |
| 2021/0013944 A1* | 1/2021 | Han | H04W 24/10 |

OTHER PUBLICATIONS

Cai et al. "Modulation and multiple access for 5G networks." In: IEEE Communications Surveys 1-4, 6-18 & Tutorials. Oct. 26, 2017 (Oct. 26, 2017) Retrieved on Sep. 15, 2019 (Sep. 15, 2019).

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | D | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 7

CO-EXISTENCE OF ORTHOGONAL TIME FREQUENCY SPACE AND LONG TERM EVOLUTION SYSTEMS

PRIORITY CLAIM

The present patent document is a 371 of International Application No. PCT/US2019/036842, filed Jun. 12, 2019, entitled "CO-EXISTENCE OF ORTHOGONAL TIME FREQUENCY SPACE AND LONG TERM EVOLUTION SYSTEMS," which claims the benefit of priority of U.S. Provisional Patent Application, Ser. No. 62/685,242, entitled "CO-EXISTENCE OF ORTHOGONAL TIME FREQUENCY SPACE AND LONG TERM EVOLUTION SYSTEMS," filed on Jun. 14, 2018. The entirety of this priority document is incorporated by reference in the present document.

TECHNICAL FIELD

This document relates to for wireless communications, and more particularly, to simultaneous operation of orthogonal time frequency space (OTFS) modulated communication systems and Long Term Evolution (LTE) systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. During the transition time in which the wireless industry migrates from the current wireless communication networks to the next generation technology, user devices that use either or both the current (legacy) protocols and the next generation protocols may be deployed in the networks.

SUMMARY

This document discloses techniques for achieving overlapping operation of wireless networks in which OTFS and LTE protocols are used for communication between the network and user devices.

In one example aspect a wireless communication method is disclosed. The method includes generating a number of transmission beams for a first group of user equipment operating using LTE, and a second group of user equipment operating using the OTFS protocol, and transmitting a first group of data packets formatted according to the LTE protocol to the first group of user equipment and a second group of data packets formatted according to the OTFS protocol to the second group of user equipment. The transmissions are performed by precoding and modulating the first group of data packets according to an LTE modulation scheme, and precoding and modulating the second group of data packets according to an OTFS modulation scheme.

In another aspect, another method of wireless communication is disclosed. The method includes receiving, on a first group of transmission beams, a first set of transmissions conforming to a legacy protocol, receiving, on a second group of transmission beams, a second set of transmissions conforming to an orthogonal time frequency space (OTFS) protocol, separating the first set of transmissions and the second set of transmissions using spatial signal separation processing, and recovering data packets from at least the first set of transmissions or the second set of data transmissions.

In yet another aspect, a wireless communication apparatus that comprises a processor and a transceiver is disclosed. The apparatus is configured to implement an above-described method.

In yet another example aspect, the above-described methods may be embodied in the form of processor-executable instructions and stored on a computer-readable program medium.

These, and other, features are described in greater details throughout the present document.

BRIEF DESCRIPTION OF THE DRAWINGS

Drawings described herein are used to provide a further understanding and constitute a part of this application. Example embodiments and illustrations thereof are used to explain the technology rather than limiting its scope.

FIG. 7 shows Uplink-downlink TDD configurations for LTE frame type 2.

DETAILED DESCRIPTION

Figure 1:
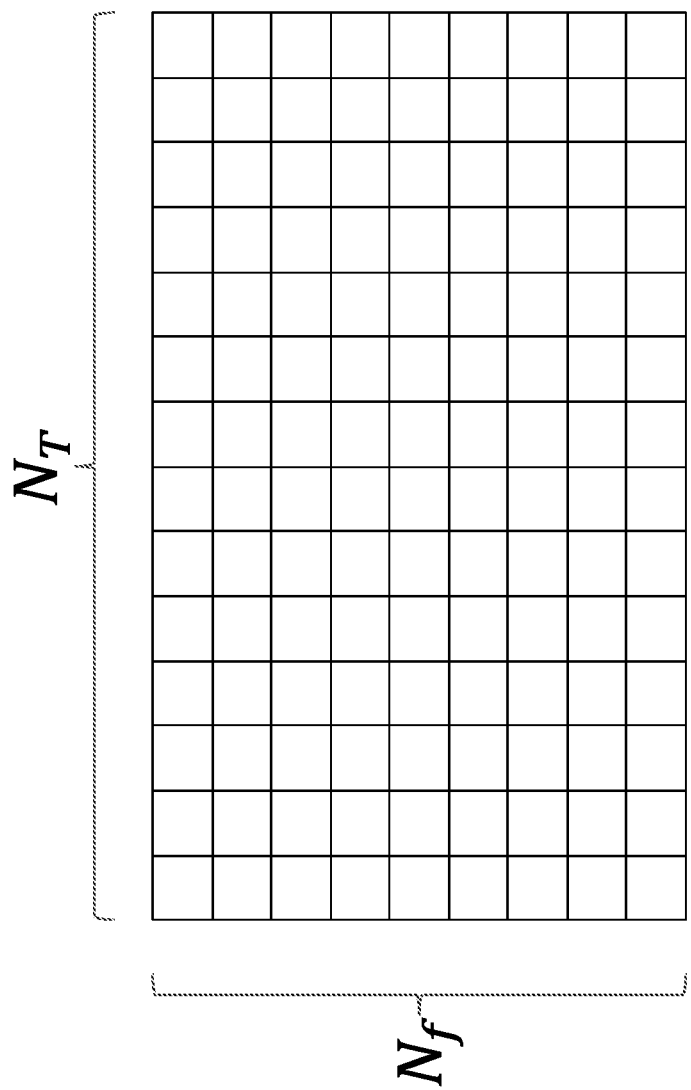
FIG. 1 is an example illustration of time-frequency plane representation. Each square represents a resource element carrying one complex sample. NT denotes the number of symbols in the sub-frame and Nf denotes the number of OFDM sub-carriers.

To make the purposes, technical solutions and advantages of this disclosure more apparent, various embodiments are described in detail below with reference to the drawings. Unless otherwise noted, embodiments and features in embodiments of the present document may be combined with each other.

1. Brief Introduction

Cellular systems have experienced tremendous degree of popularity and have transformed many aspects of modern society. They are arguably one of the most important inventions in modern technology. The 3GPP Standards body released the LTE standard for cellular communications, which defines the most technologically capable cellular system to date. A fundamental characteristic of LTE is that it is based on Orthogonal Frequency Division Multiplexing (OFDM) modulation. LTE has evolved from its initial release, and additional features have been included. Among these, multiuser MIMO transmission, which enables spatial reuse of the spectrum, has been added to the original standard.

Orthogonal Time Frequency Space (OTFS) modulation has been recently proposed as a new waveform for cellular communications. In contrast to OFDM, OTFS modulation operates in the delay-spread-Doppler-spread plane domains, which are related to frequency and time by the symplectic Fourier transform, a two-dimensional discrete Fourier transform.

In this disclosure, we describe a wireless communications system for OTFS and LTE. The system supports communication with standard 'off-the-shelf' LTE user terminals. It also supports communication with a different type of user terminals based on OTFS. In a given coverage area served by a base station, LTE terminals and OTFS terminals can communicate simultaneously with the base station. The system also supports mobility features of LTE, including handoffs, as well as mobility features of OTFS.

1.1 Definitions

In this section we include some definitions and basic concepts used throughout the document. A base station (BS) consists of wireless transmission/reception equipment and connectivity to the internet, through a set of protocols and wired communications equipment.

A user equipment (UE) consists of wireless transmission/reception equipment, either in portable or fixed form, battery powered or connected to the mains. Such equipment may be in the form of a cell phone or other mobile connectivity device, or a customer premises equipment.

In LTE, wireless transmission is organized in so-called radio frames of duration 10 ms. A radio frame is subdivided into 10 sub-frames of duration 1 ms. A radio sub-frame contains a number of transmission signals, organized in physical channels. Physical channels are described for the following functions, among others:

Cell discovery by the UE
Initial network access from the UE, and/or timing acquisition
Transmission of control information
Transmission of user data
Transmission of signals for the purposes of channel estimation and other functions related to the operation of the system.

Physical channels are further categorized as uplink, if transmitted by the UEs and received by the BS, and downlink, if transmitted by the BS and received by the UEs.

Figure 2:
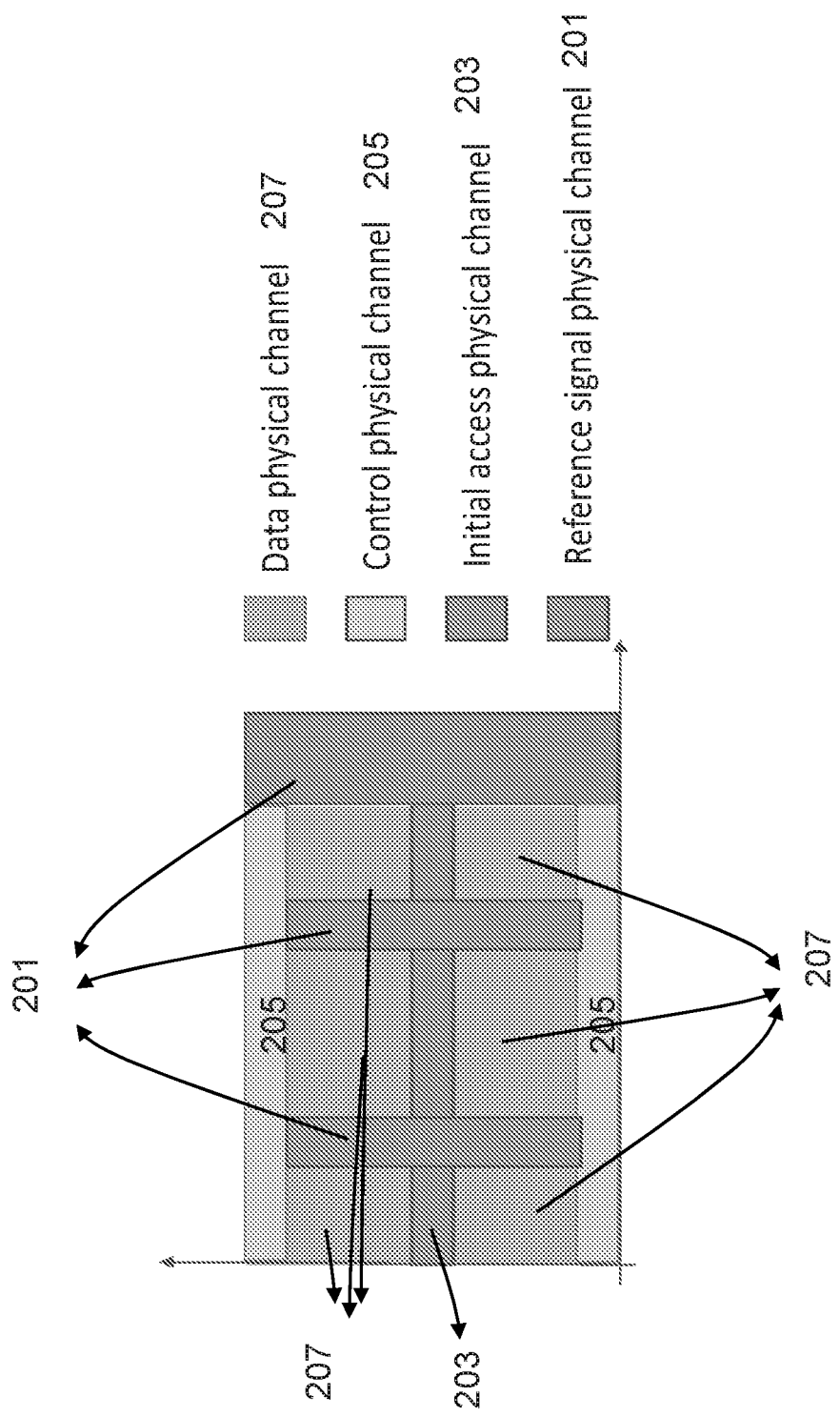
FIG. 2 is an example illustration of physical channels represented in the time-frequency plane.

It is customary in LTE to represent physical signals in the time-frequency plane, where each row represents complex samples loaded onto one OFDM sub-carrier for all symbols in a sub-frame, and each column represents complex samples loaded onto one OFDM symbol for all sub-carriers. Each individual time-frequency location is referred to as resource element (RE). FIG. 1 illustrates the concept of time-frequency plane, while FIG. 2 represents physical channels represented in the time frequency plane. In FIG. 2, resource elements allocated for various transmissions are depicted along a time-frequency plane. The resource allocation is grouped in several logical groups, called channels, and include reference signal physical channel 201 on which reference signals (pilots) are transmitted, initial access physical channel 203 used by user equipment to perform initial access to a wireless network, control physical channel 205 that carries control signals, and data physical channel 207 for carrying user data.

1.2 OTFS Waveform Description

Figure 3:
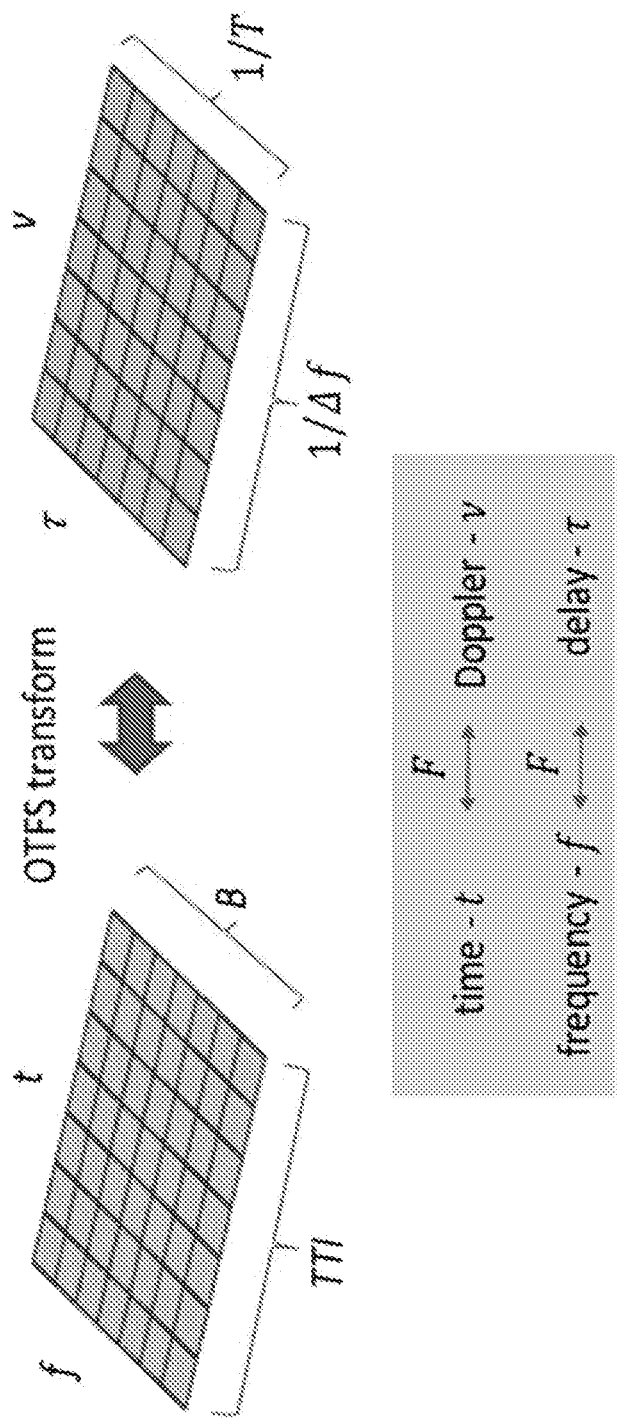
FIG. 3 is an example illustration of OTFS waveform.

Traditional OFDM modulation operates in the frequency-time domains. An OFDM resource elements (RE) occupies one subcarrier on one particular OFDM symbol. In contrast, OTFS modulation operates in the Delay spread-Doppler plane domains, which are related to frequency and time by the symplectic Fourier transform, a two-dimensional discrete Fourier transform FIG. 3 illustrates the relationships between different domains.

In OTFS, resource elements are defined in the delay-Doppler domains, which provide a two-dimensional grid similar to OFDM. The size of the delay-Doppler resource grid is related to the size of the frequency-time plane by the signal properties, i.e. bandwidth, sub-frame duration, sub-carrier spacing, and symbol length. These relationships are expressed by the following equalities:

$$N_\tau = B/\Delta f$$

$$N_v = TTI/T$$

where $N_\tau$ denotes the number of bins in the Delay Spread domain and $N_v$ the number of bins in the Doppler domain in the OTFS grid. B stands for the allocated bandwidth, $\Delta f$ is the subcarrier spacing, TTI is the sub-frame duration, and T is the symbol duration. Note that in this example there is an exact matching between the delay spread and frequency domains, and, similarly, between the Doppler and time domains. Therefore, the number of delay dimensions equals the number of active subcarriers in the OFDM signal, while the number of Doppler dimensions equals the number of OFDM symbols in the sub-frame.

An OTFS Physical Resource Block (PRB) can be defined as the number of symbols, also known as resource elements (RE) corresponding to the minimum resource allocation unit, defined in the Delay Spread-Doppler domains. For example, an OTFS PRB may be defined as a region occupying $N_{RB,\tau} \times N_{RB,v}$ RE, where the total number of RE is $N_{RB} = N_{RB,\tau} N_{RB,v}$. Different OTFS PRB configurations might be considered. Eg. in one particular case we may define a PRB to span $N_{RB,\tau} \times 1$ RE, i.e. this specific OTFS PRB occupies a single Doppler dimension. Section 5 provides additional details of OFDM transmission and reception techniques.

1.2.1 Conversion to Time Domain Samples

Denote the discrete OTFS signal in the delay-Doppler plane by $x(k, l)$, which corresponds to the $k^{th}$ delay bin and $l^{th}$ Doppler bin. After the symplectic transform, the following signal is obtained in the frequency-time plane:

$$X[m, n] = \frac{1}{N_\tau N_v} \sum_{k=0}^{N_\tau-1} \sum_{l=0}^{N_v-1} x[k, l] e^{-j2\pi\left(\frac{mk}{N_\tau} - \frac{nl}{N_v}\right)}$$

Conversion to time domain samples can be executed in a number of ways.

In one embodiment, a conventional OFDM modulator is used to convert each symbol $X[m, 0], \ldots, X[m, N_v-1]$ to time domain samples. As part of the OFDM modulation process, a cyclic prefix may be added before the samples of each OFDM symbol.

In another embodiment, the OTFS signal is converted directly (i.e. without intermediate conversion to time-frequency plane) to time domain samples, by a single inverse Fourier Transform in the Doppler domain. Time domain samples are obtained by direct conversion as:

$$s[k + nN_\tau] = \frac{1}{N_v} \sum_{l=0}^{N_v-1} x[k, l] e^{j2\pi\left(\frac{nl}{N_v}\right)},$$

$$k = 0 \ldots N_\tau - 1,$$

$$n = 0 \ldots N_v - 1.$$

In this case, it is also possible to insert a cyclic prefix between blocks of $N_\tau$ samples, consisting of the last samples of the block. Alternatively, it is also possible to not insert a cyclic prefix and use a Guard Grid instead, as it is detailed later.

2. Example System Embodiments

In this document we describe a wireless communications system for OTFS and LTE. It consists of the following elements:

A cellular coverage area consisting of one or more cells, each of them containing at least one base station (BS). The cell may be further divided in sectors, for example three sectors of 120 degrees or four sectors of 90 degrees.

Figure 4:
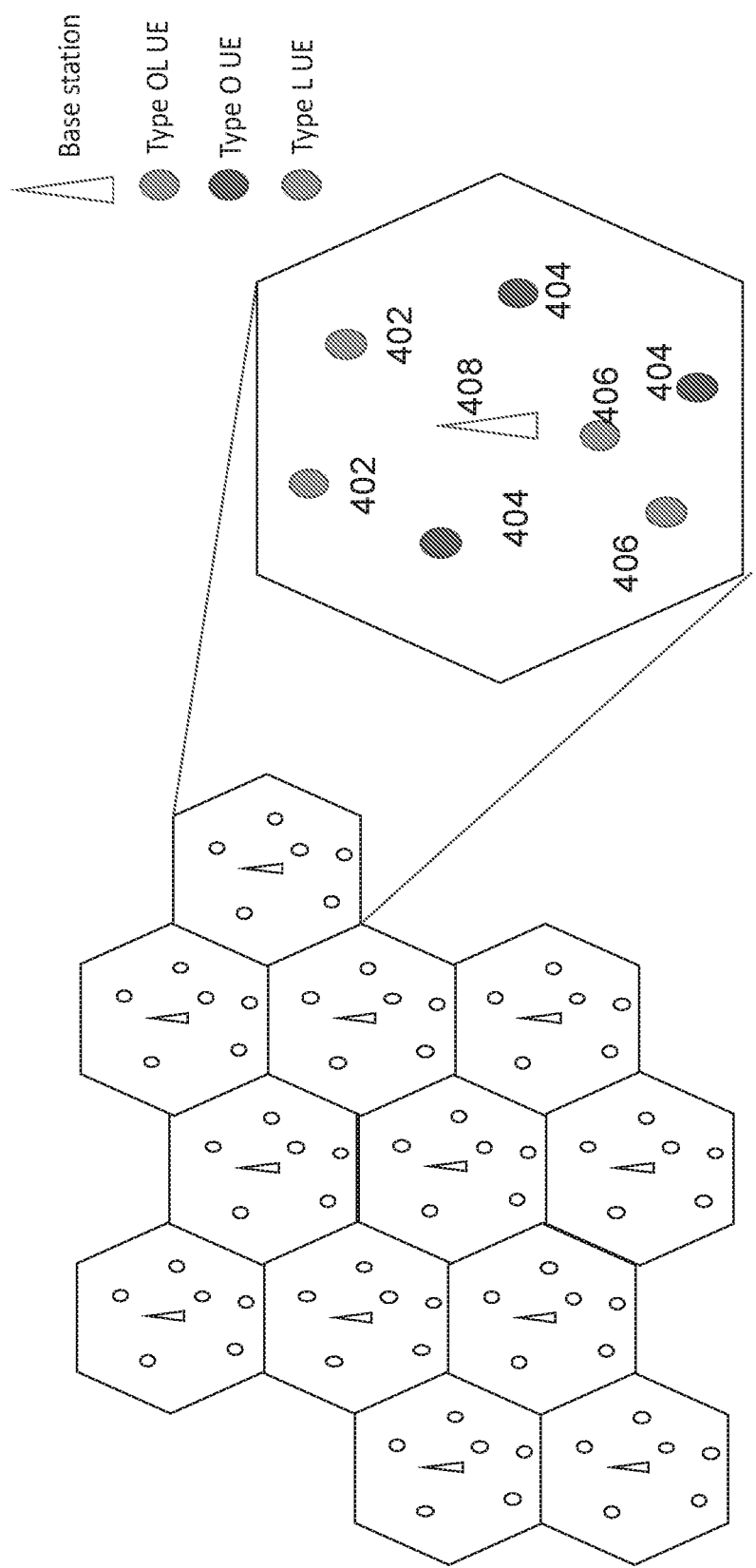
FIG. 4 is an example illustration of wireless communications system for OTFS and LTE.

A group of user equipments (UE) distributed in the coverage area. UE fall under the following types, according to their capabilities:
  Type OL: UE of this type are fully OTFS-capable and fully LTE-capable
  Type O: UE of this type are fully OTFS-capable and partially LTE-capable
  Type L: UE of this type are fully LTE-capable but not OTFS-capable An embodiment of the system is illustrated in FIG. 4. As depicted, a wireless cell may include zero or more of type OL UEs 402, type O UEs 404 and type L UEs 406, all served by a corresponding base station 408.

The system consists of a set of communications protocols and physical channels, including physical signaling, specified as follows:
  LTE communications protocols and physical channels, including physical signaling, as specified by the LTE 3GPP standard (Releases 8 to 15). We refer to the ensemble as LTE signaling.
  OTFS communications protocols and physical channels, including physical signaling, based on the OTFS waveform or other waveforms. We refer to the ensemble as OTFS signaling.

All UEs types are able to communicate with the base station. In one embodiment, UEs transmit to the base station according to the following rule:
  Type OL UEs transmit and receive data using LTE signaling or OTFS signaling, depending on configuration.
  Type O UEs may transmit data using LTE or OTFS signaling in the uplink, and receive data using OTFS signaling in the downlink.
  Type L UEs transmit and receive data using LTE signaling.

In addition, users are categorized, according to their activity state, as:
  Non-active users, which may be connected to the network but are not active, or only performing monitoring functions.
  Active users, which are ready for transmission/reception activity, and may have transmission/reception activity but not related to user data.
  Scheduled users, which transmit/receive data in the current sub-frame. A scheduled user is also an active user.

2.1 Duplexing

The system described supports both time division duplex (TDD) and frequency division duplex (FDD) operation. These two operating modes are described in the following sub-sections.

2.1.1 Time Division Duplex

Figure 6:
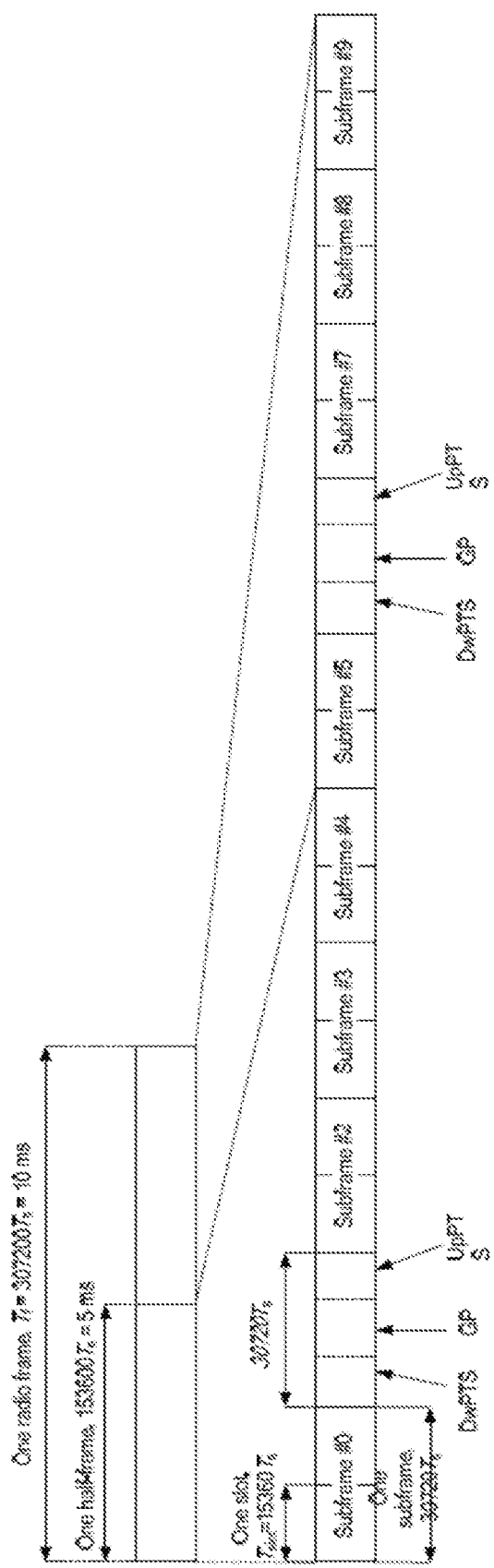
FIG. 6 is an illustration of LTE frame type 2 for 5 ms switch-point periodicity.

In TDD operation, each radio frame is divided into uplink (U), downlink (D), and special (S) sub-frames, according to LTE frame type 2. A representation of LTE frame type 2, as well as all possible U, D, and S configurations, is given in FIG. 6 and FIG. 7.

LTE signaling follows a pre-specified format for frame type 2. OTFS signaling direction (uplink vs downlink) is equal to the signaling direction of LTE signaling. When no LTE signaling is present, a different signaling direction arrangement may be used for OTFS. Uplink configuration is determined by upper layer signaling.

2.1.2 Frequency Division Duplex

In FDD operation, LTE signaling uses frame type 1. The same frequency bands can be used for LTE signaling and OTFS signaling in the uplink direction. Also, the same frequency bands can be used for LTE signaling and OTFS signaling in the downlink direction. Alternatively, the following frequency band arrangements can be made:
- Different frequency bands are used for LTE signaling and OTFS signaling, either in the uplink direction, downlink direction, or both.
- The same frequency band is used for LTE signaling and OTFS signaling in the uplink direction. The bandwidth is split into two parts, and one part is used by an LTE carrier, while the other part is used by an OTFS carrier.
- The same frequency band is used for LTE signaling and OTFS signaling in the downlink direction. The bandwidth is split into two parts, and one part is used by an LTE carrier, while the other part is used by an OTFS carrier.

2.2 Coexistence Configurations

We describe as coexistence configurations the mechanisms for multiplexing users belonging to different categories. In one embodiment of the system, the following coexistence configurations apply:
- Multiple Type OL and Type O UEs are multiplexed as follows, when using OTFS signaling:
  - Using spatial multiplexing. In the rest of the document we refer to different spatially multiplexed transmissions as different spatial streams
  - Using delay-Doppler multiplexing, by assigning disjoint sets of delay-Doppler resources to different UEs
  - Using time-frequency multiplexing, by assigning disjoint sets of time-frequency resources to different UEs.
- Multiple Type OL and Type L UEs are multiplexed as follows, when using LTE signaling:
  - Using established LTE mechanisms for UE multiplexing, including spatial multiplexing and time-frequency multiplexing.
- Multiple Type OL, Type O and Type L UEs are multiplexed as follows, when using a combination of LTE signaling and OTFS signaling:
  - Using spatial multiplexing, where each spatial dimension contains UEs using only one of the following: OTFS signaling, or LTE signaling
  - Using time-frequency multiplexing, where at least two disjoint sets of resources are defined in the time-frequency plane, and one region is used for LTE signaling while the other region is used for OTFS signaling
  - Using a shared set of time-frequency resources for both OTFS and LTE, and using receiver signal processing to separate the signals. In particular, successive interference cancellation (SIC) and/or iterative (turbo) multiuser detection.
  - Using time-frequency multiplexing according to established LTE mechanisms, in the set of resources allocated to LTE signaling
  - Using time-frequency or delay-Doppler multiplexing, when using OTFS signaling, in the set of resources allocated to OTFS signaling.

Based on these mechanisms, we categorize spatial streams (or beams) as:
- OTFS spatial streams, containing OTFS signaling only
- LTE spatial streams, containing LTE signaling only
- OTFS+LTE spatial streams, containing a combination of OTFS and LTE signaling The categorization is valid for both uplink and downlink streams.

Figure 5:
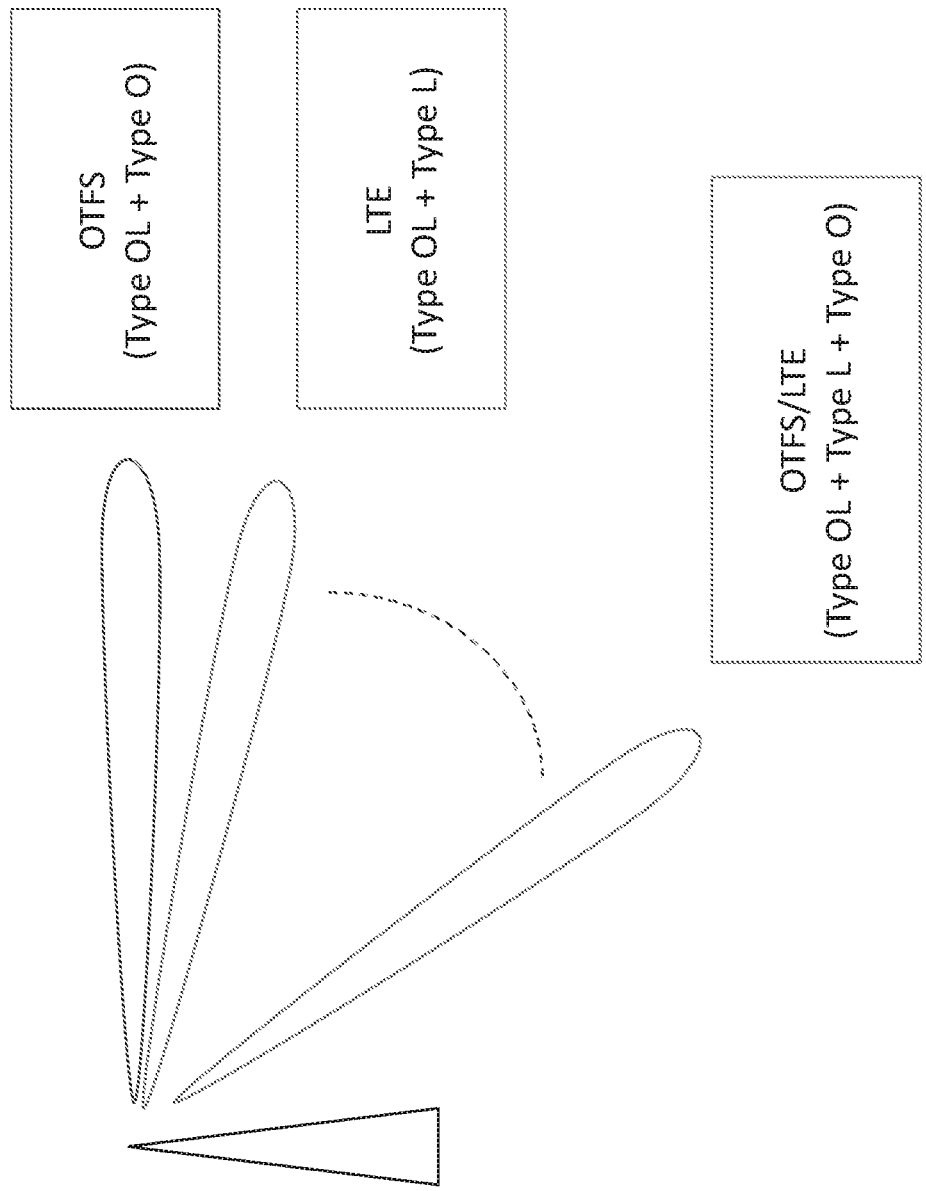
FIG. 5 is an illustration of coexistence configurations resulting in three different types of spatial streams.

An illustration of the coexistence configurations is provided in FIG. 5. Note that spatial multiplexing is intended as spatial separation according to the UE channel responses, not necessarily as directional beamforming, which is depicted in the figure as an example for illustration purposes.

Spatial multiplexing of UEs of types OL, O, and L is achieved with different approaches for uplink and downlink. For the uplink, spatial multiplexing is achieved by means of signal separation using receiver side processing, by means of a hybrid multiuser receiver. For the downlink, spatial multiplexing is achieved by means of signal separation using transmitter side processing, by means of a hybrid spatial precoder.

3. Uplink Description

In this section we describe in detail the arrangement of uplink processing and physical layer channels and signals. Such an arrangement is intended to implement coexistence rules described in the previous section.

3.1 Uplink Multiplexing

Uplink multiplexing of different signaling schemes, i.e. OTFS and LTE, is achieved by means of spatial multiplexing, and, in the case of OTFS+LTE streams, time-frequency multiplexing. Separation of spatial streams is performed using a hybrid multiuser receiver.

3.2 Physical Signals Description

Figure 8:
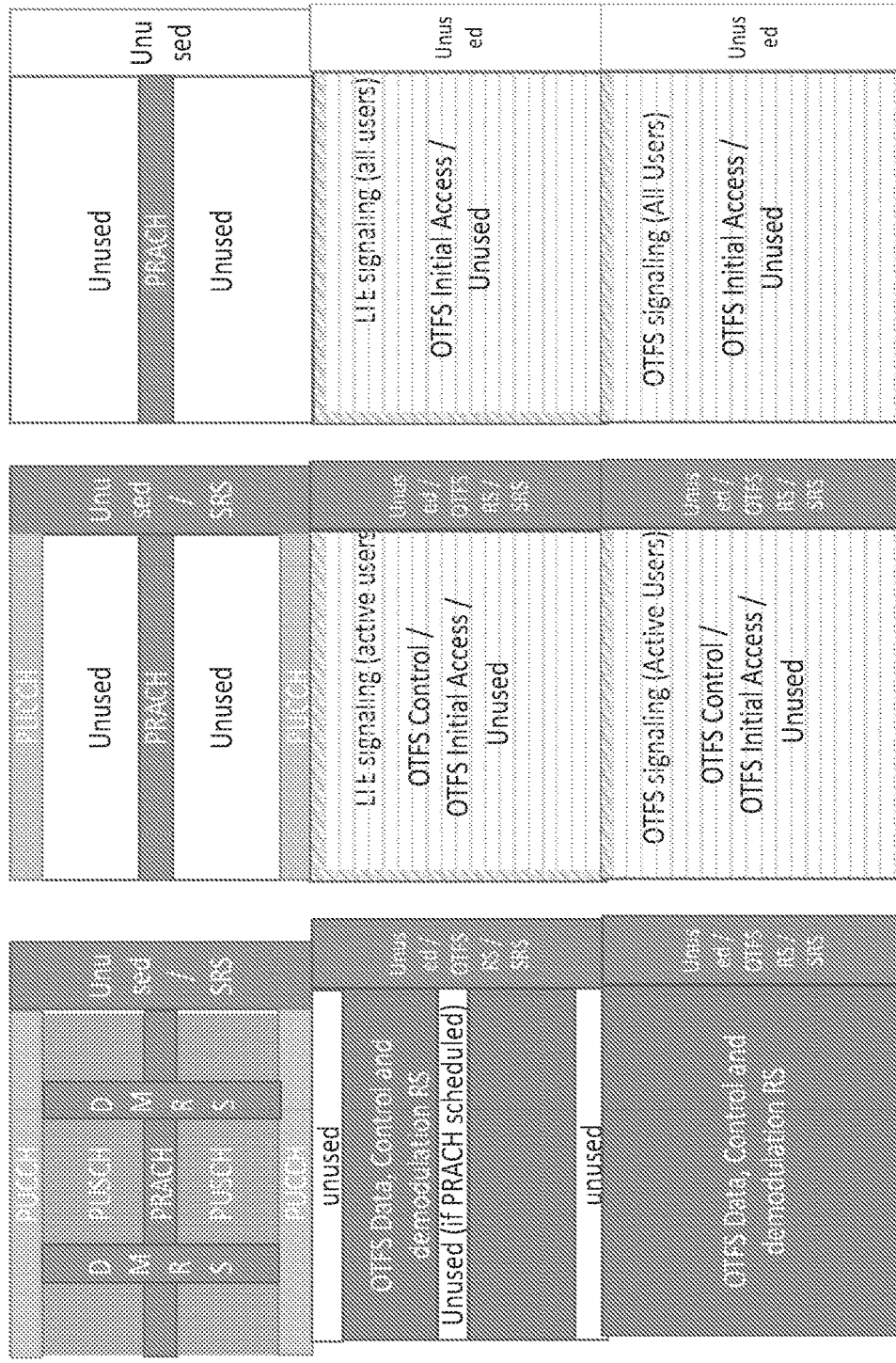
FIG. 8 is an example illustration of uplink transmitted signals. Top: uplink LTE transmitted signals; Middle: OTFS transmitted signals; Bottom: OTFS transmitted signals (another embodiment).

Uplink signals consist of the following types:
- OTFS data transmission signals: OTFS scheduled users may transmit data signals
- OTFS control signals: OTFS active users may transmit control signals
- OTFS initial access signals: all OTFS users may transmit initial access signals
- OTFS reference signals: active OTFS users may transmit reference signals
- LTE data transmission signals: LTE scheduled users may transmit data signals
- LTE control signals: LTE active users may transmit control signals
- LTE initial access signals: all LTE users may transmit initial access signals
- LTE reference signals: LTE active users may transmit reference signals In the following subsections we provide details as of how these signals are transmitted. A diagram depicting the location of different signals in a given sub-frame is provided in FIG. 8.

3.2.1 LTE Data Transmission Signals

LTE Data transmission signals are transmitted according to the LTE Standard. OTFS signals may be transmitted using the same time-frequency resources, and separated by means of receiver processing, such as successive or iterative interference cancellation.

3.2.2 LTE Initial Access Signals

LTE Data initial access signals are transmitted according to the LTE Standard. OTFS signals may be transmitted using the same time-frequency resources, and separated by means of receiver processing, such as successive or iterative interference cancellation.

3.2.3 LTE Reference Signals

LTE reference signals are transmitted according to the LTE Standard. OTFS signals may be transmitted using the same time-frequency resources, and separated by means of receiver processing, such as successive or iterative interference cancellation.

3.2.4 OTFS Data Transmission Signals

In OTFS streams, OTFS data-carrying signals from scheduled users are transmitted using all time-frequency resources available in a given transmission sub-frame, except for those allocated for reference signal transmission, for both OTFS and LTE users. In a different embodiment, OTFS signals are not transmitted in a set of resources reserved by the system. In particular, in a set of resources reserved for transmission of random access preambles, i.e. PRACH preambles, as specified by the LTE standard. OTFS signals are also not transmitted in resources reserved for LTE PUCCH transmission.

3.2.5 OTFS Initial Access Signals

OTFS users wishing to access the system use LTE-compliant PRACH preambles as configured by the system. PRACH preambles are also used for all other purposes specified in the LTE standard, such as timing recovery or scheduling requests. Alternatively, OTFS users wishing to access the channel or to perform other functions for which the LTE PRACH preamble is used, use another type of signaling. Such signaling may be transmitted using the same set of time-frequency resources as the LTE PRACH preamble, or a separate set of resources.

3.2.6 OTFS Reference Signals

OTFS reference signals, which are used for channel estimation, are transmitted by OTFS active users, according to a schedule and format specified by the system. In one embodiment, OTFS reference signals are defined as orthogonal and non-orthogonal. Orthogonal reference signals are separable without any prior information and can be multiplexed in a smaller number compared to non-orthogonal reference signals. Non-orthogonal reference signals require prior information in order to be separated but can be multiplexed in larger number than orthogonal reference signals.

OTFS reference signals are transmitted using part of, or all, time-frequency resources of the last symbol of the sub-frame.

In another embodiment, OTFS reference signals are transmitted in time-frequency resources other than the last symbol of the sub-frame and are separated from OTFS and LTE data signals by means of receiver processing, such as successive or iterative interference cancellation.

3.3 Uplink Receiver

In one implementation of the system, the uplink receiver consists of a hybrid multiuser receiver, capable of simultaneously separating and detecting signals from several users, and where LTE signaling and OTFS signaling are used.

Figure 9:
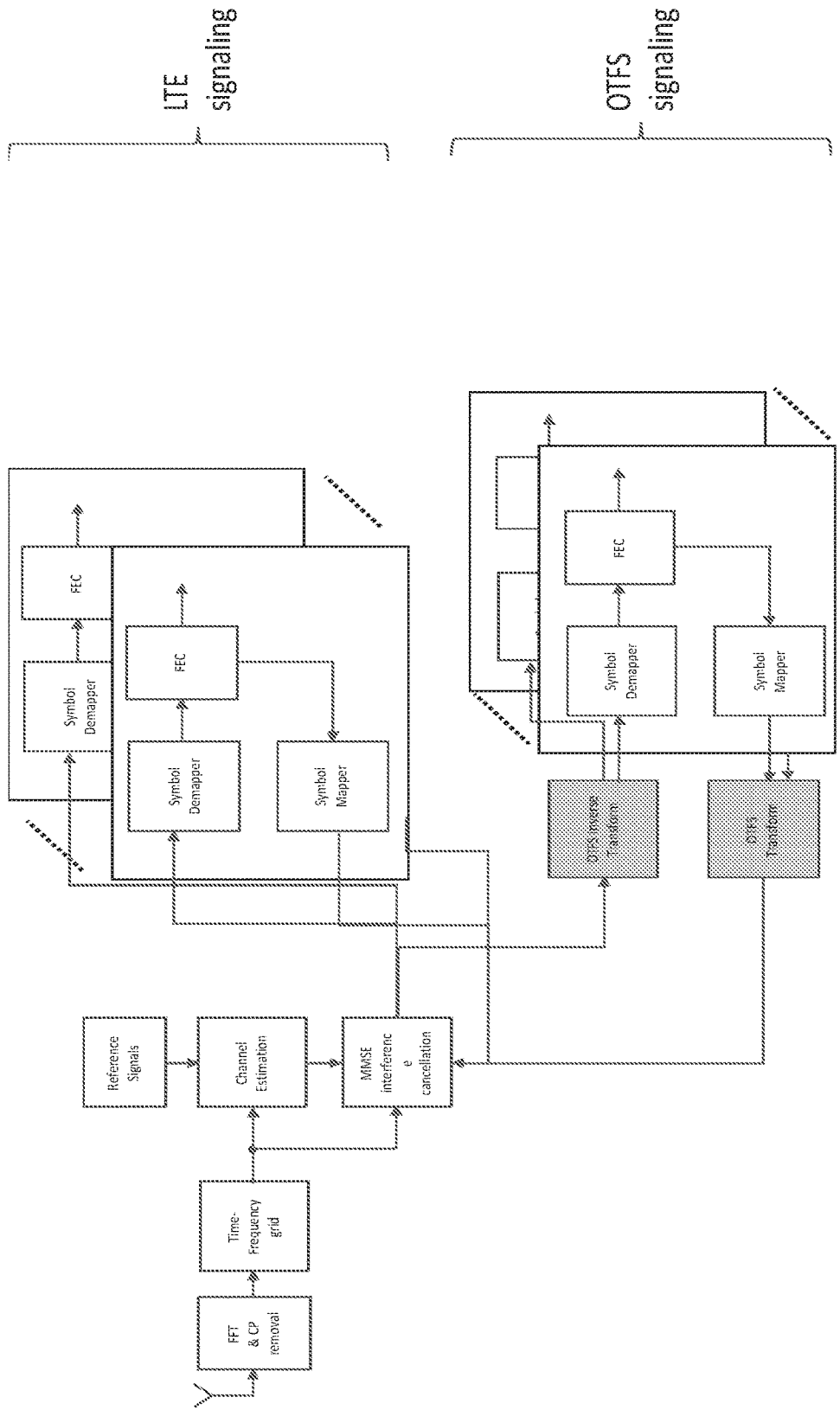
FIG. 9 is a block diagram of an example of an uplink iterative receiver.

One implementation of the hybrid multiuser receiver consists of an iterative receiver. In an iterative receiver, an initial stage, responsible for interference cancellation, and a second stage, responsible for data decoding, pass each other information and iterate in order to separate and detect all signals. An example block diagram is provided in FIG. 9.

4. Downlink Description

In this section we describe in detail the arrangement of downlink processing and downlink physical layer channels and signals. Such an arrangement is intended to implement coexistence mechanisms described in Section [0071].

4.1 Downlink Multiplexing

Figure 10:
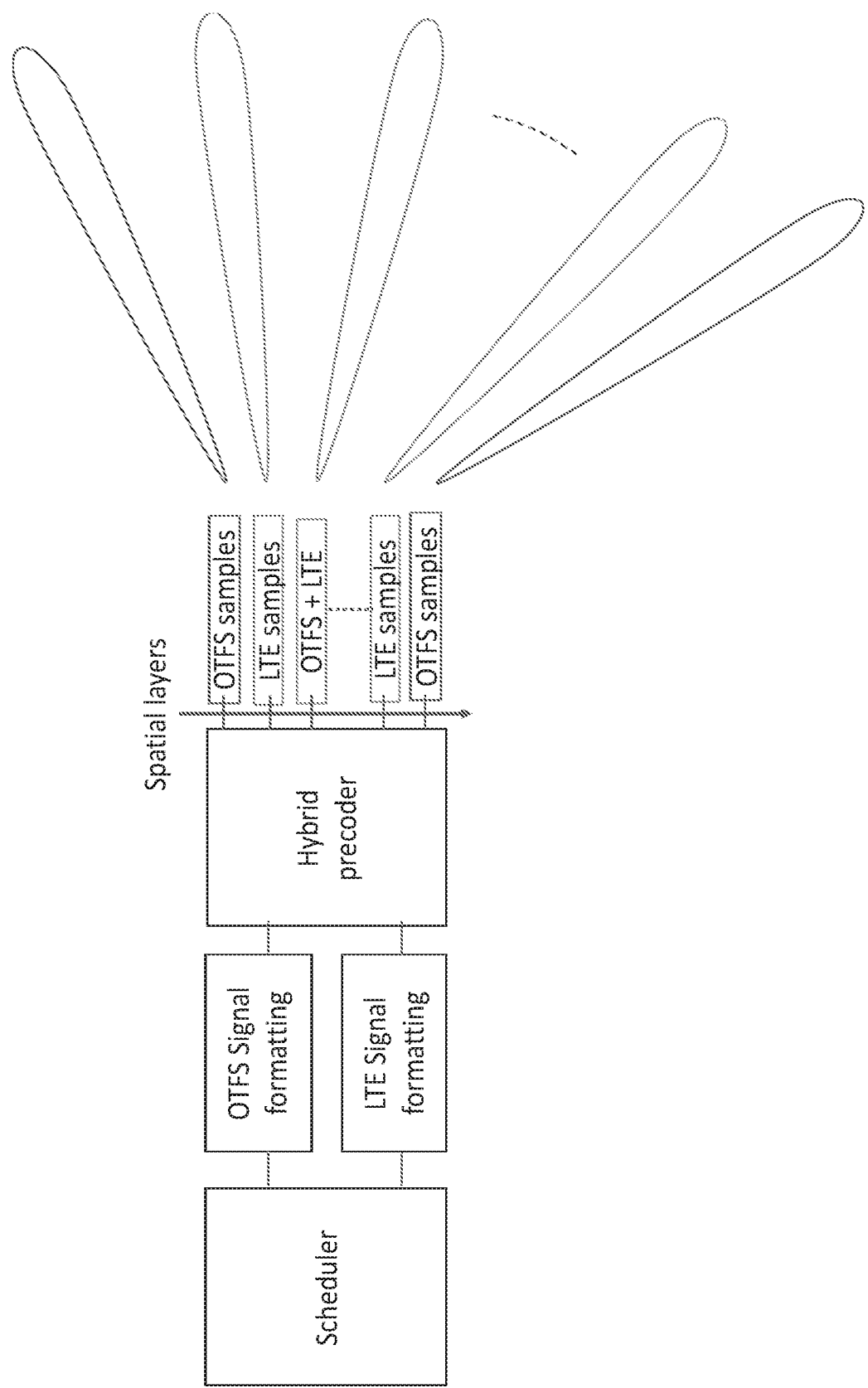
FIG. 10 illustrates an example of a diagram of downlink base station transmitter with hybrid precoder.

Spatial separation of users using OTFS signaling and LTE signaling is carried out by means of a hybrid precoder. A high-level block diagram of the downlink transmitter is provided in FIG. 10. After the scheduler, Data packets are encoded and formatted according to either OTFS signaling or LTE signaling and fed to the hybrid precoder. At the output of the hybrid precoder, a number of spatial streams are generated and transmitted.

4.2 Hybrid Precoder Description

Figure 11:
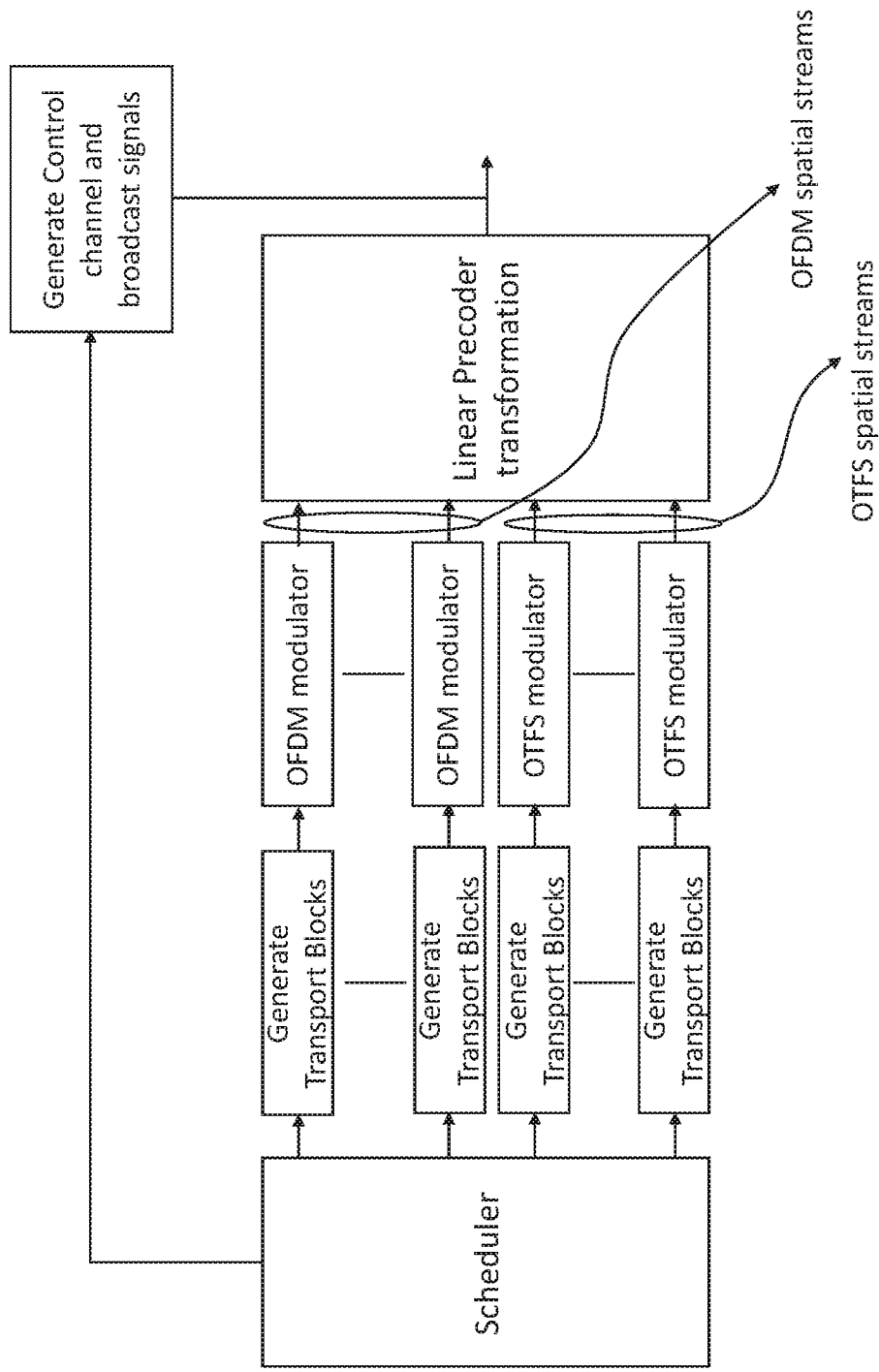
FIG. 11 is an example illustration of a hybrid linear precoder.

A hybrid precoder consists of signal processing algorithms that reduce or eliminate interference between spatial streams. We distinguish between linear precoders and non-linear precoders. Linear precoders apply a linear transformation over the input data streams. Some examples of linear precoders that can be applied are a zero forcing precoder, which completely eliminates interference, an MMSE precoder, which seeks to minimize the mean square error at the receiver, or a regularized zero forcing precoder, which finds a balance between interference reduction and increase in transmit power. A block diagram of a linear hybrid precoder is shown in FIG. 11.

Figure 12:
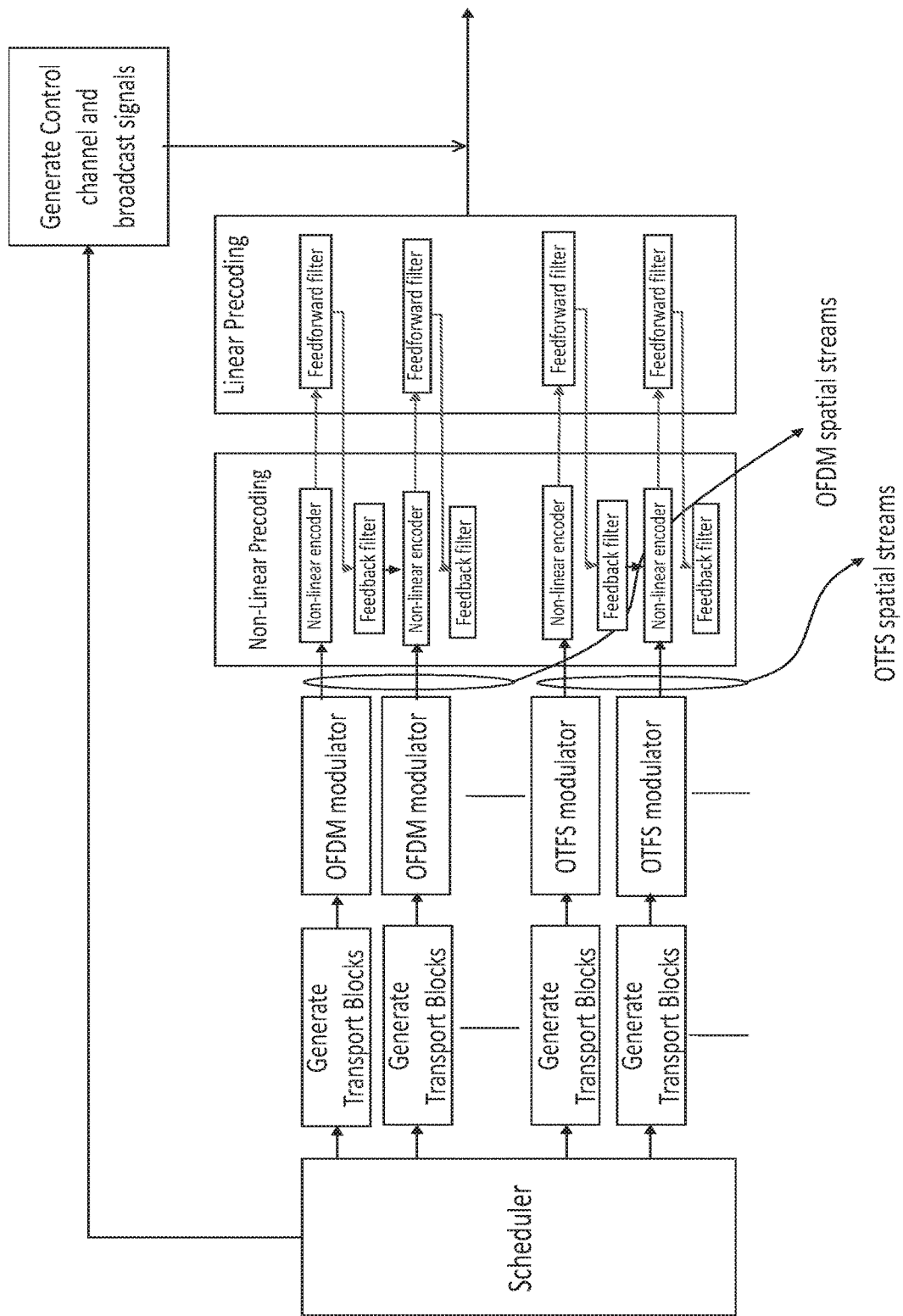
FIG. 12 is an example illustration of a hybrid non-linear precoder.

A non-linear precoder consists of both linear and non-linear stages. In the non-linear stage, a perturbation is introduced that modifies the transmitted signal, with the objective of reducing or eliminating interference at the receiver side, as well as reducing transmitted energy. An example implementation of a non-linear precoder is shown in FIG. 12. In the example implementation, the non-linear precoder may operate as follows: a scheduling of transmission is performed by a scheduler module, and provides input to the generation of control channel and broadcast signals.

Based on the schedule, transport blocks are generated and the outputs are OFDM modulated for generating a number of spatial streams of OTFS signals. Each stream is then processed through a non-linear precoding stage. The output of the non-linear precoding is then linearly precoded. A feedback is generated from the feedforward filter used in the linear precoding. The feedback is filtered through a feedback filter in the non-linear precoding stage and is provided as an input to the precoding on neighboring spatial stream.

4.3 Physical Signals Description

We present three different example embodiments regarding downlink signals:
Embodiment 1: For LTE signaling, all sub-frames are normal sub-frames.
Embodiment 2: For LTE signaling, some sub-frames are MBSFN sub-frames.
Embodiment 3: For LTE signaling, some sub-frames are ABS sub-frames.

4.3.1 Embodiment 1

In this embodiment, all sub-frames are normal sub-frames.

4.3.1.1 LTE Signaling

4.3.1.1.1 Broadcast Signals

In the downlink, the following signaling is transmitted in broadcast mode, according to the LTE standard, in a way that can be received by all UEs in the coverage area:
LTE signaling in the control region, which includes all frequency domain resources in the first one, two or three symbols of the sub-frame, is transmitted as established in the LTE standard. This includes PCFICH, PHICH, and PDCCH physical channels.
LTE common reference signal (CRS) is transmitted as established in the LTE standard.
LTE cell discovery signals, including PSS, SSS, and PBCH, are transmitted as established in the LTE standard.
LTE system information blocks (MIB, SIB), which are part of the PBCH and PDSCH, are transmitted as established in the LTE standard.
LTE CRS may be transmitted at a higher power level, according to the LTE standard.

4.3.1.1.2 Non-Broadcast Signals

Non-broadcast LTE signaling is transmitted according to the LTE standard. Non-broadcast signals may be directed to the corresponding users by means of a hybrid precoder.

4.3.1.2 OTFS Signaling

Figure 13:
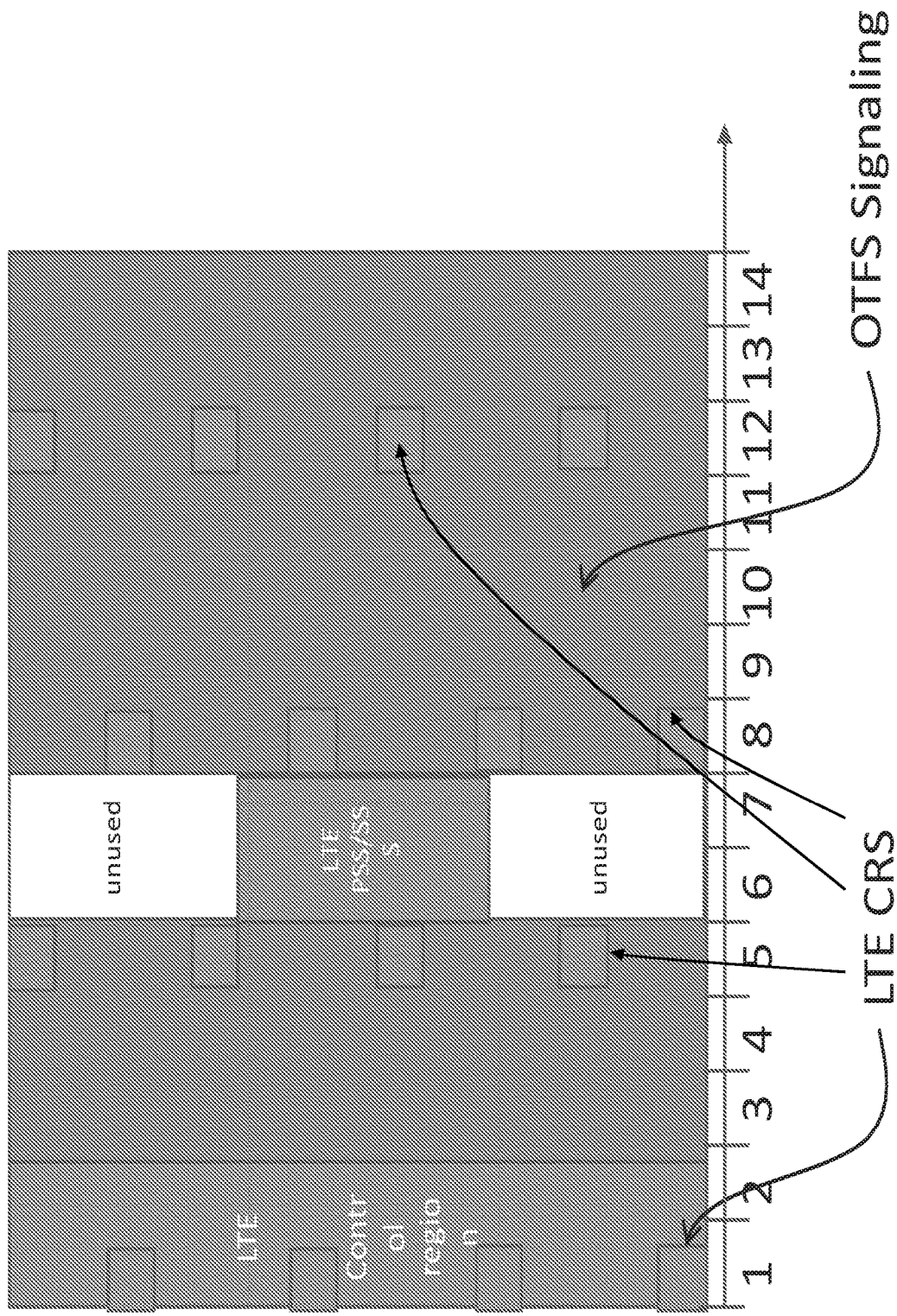
FIG. 13 is an example of OTFS Signaling region for configuration 1.
Figure 14:
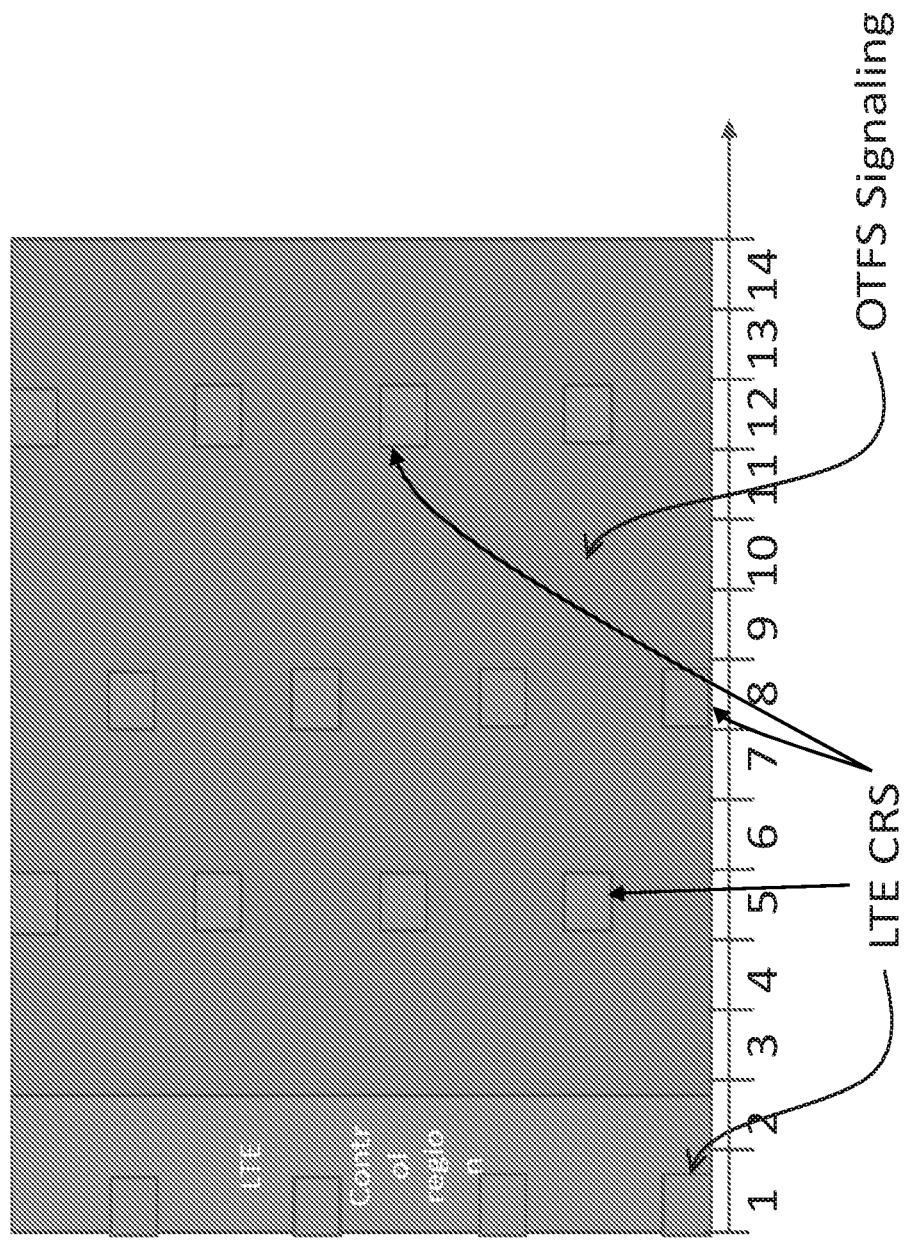
FIG. 14 is an example of OTFS Signaling region for configuration 2.
Figure 15:
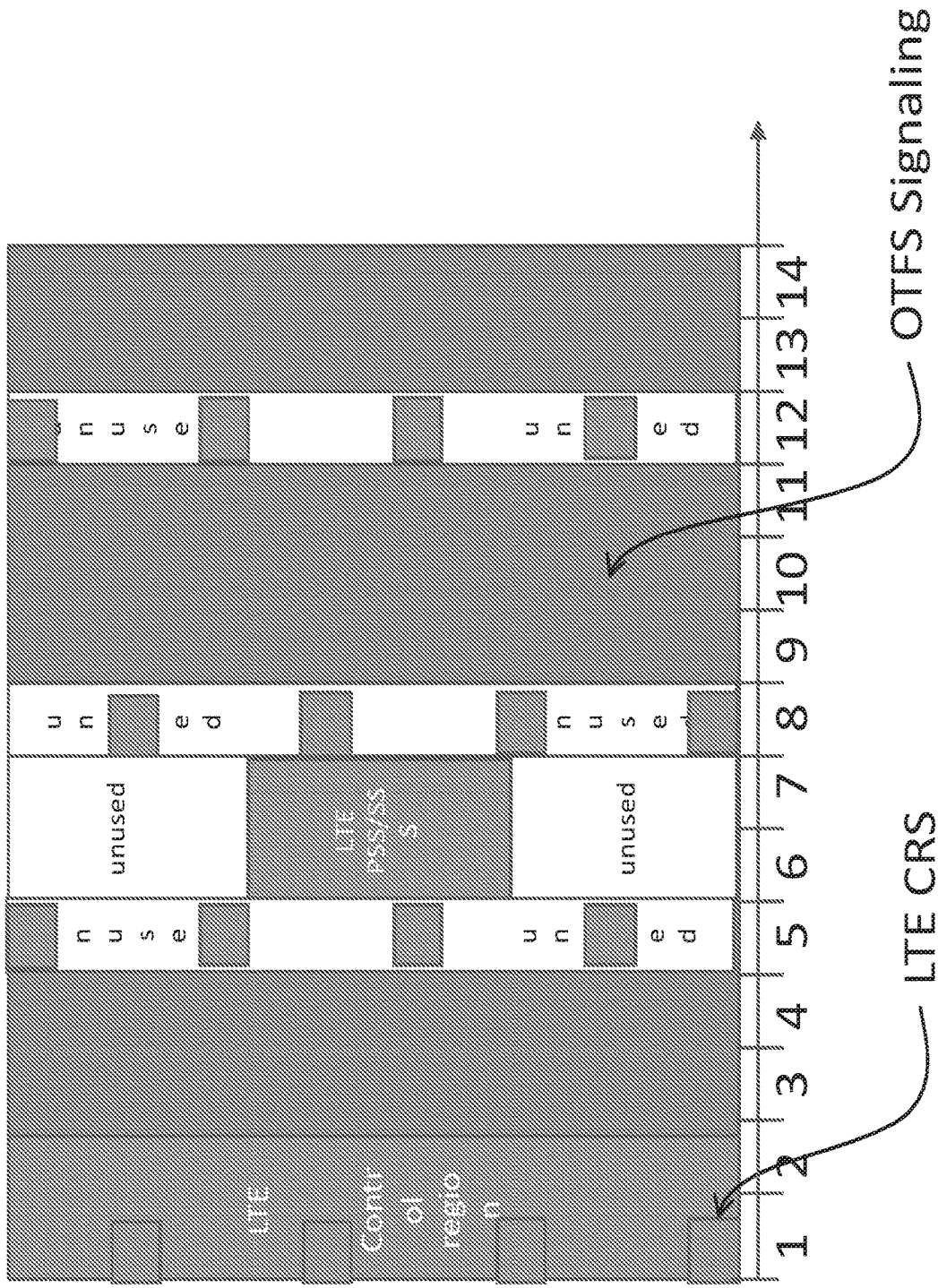
FIG. 15 is an example of OTFS Signaling region for configuration 3.
Figure 16:
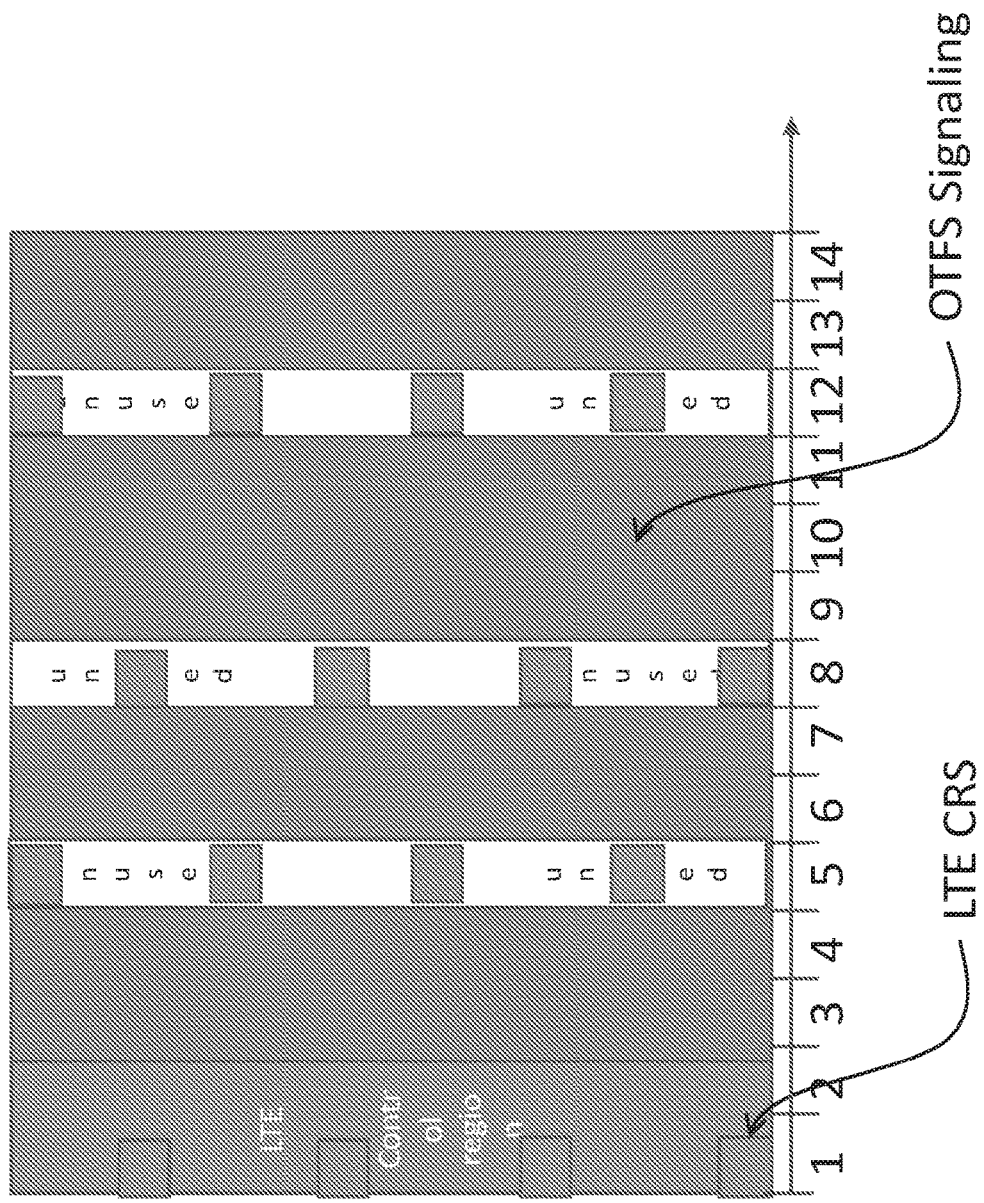
FIG. 16 is an example of OTFS Signaling region for configuration 4.

In one embodiment, OTFS signaling is transmitted using all the resources except for the resources used for LTE broadcast signals. Alternatively, transmission of OTFS signaling is extended to resources occupied by CRS, and, if necessary, a higher power level (power boosting) is assigned to the CRS signal.
It is beneficial for OTFS to maintain regularity of the time-frequency grid. Therefore, in one embodiment, resource allocation for OTFS defines regular time-frequency grids while not interfering with LTE broadcast signals. The following configurations for OTFS signaling are described:
1. For subframes 1 and 6 in an LTE frame, and where CRS power boosting is used, OTFS signaling is defined over the time frequency regions defined in FIG. 13. OTFS signaling is overlaid with LTE CRS.
2. For subframes other than 1 and 6 in an LTE frame, and where CRS power boosting is used, OTFS signaling is defined over the time frequency regions defined in FIG. 14. OTFS signaling is overlaid with LTE CRS.
3. For subframes 1 and 6 in an LTE frame, and where CRS power boosting is not used, OTFS signaling is defined over the time frequency regions defined in FIG. 15.
4. For subframes other than 1 and 6 in an LTE frame, and where CRS power boosting is not used, OTFS signaling is defined over the time frequency regions defined in FIG. 16.

4.3.2 Embodiment 2

Figure 17:
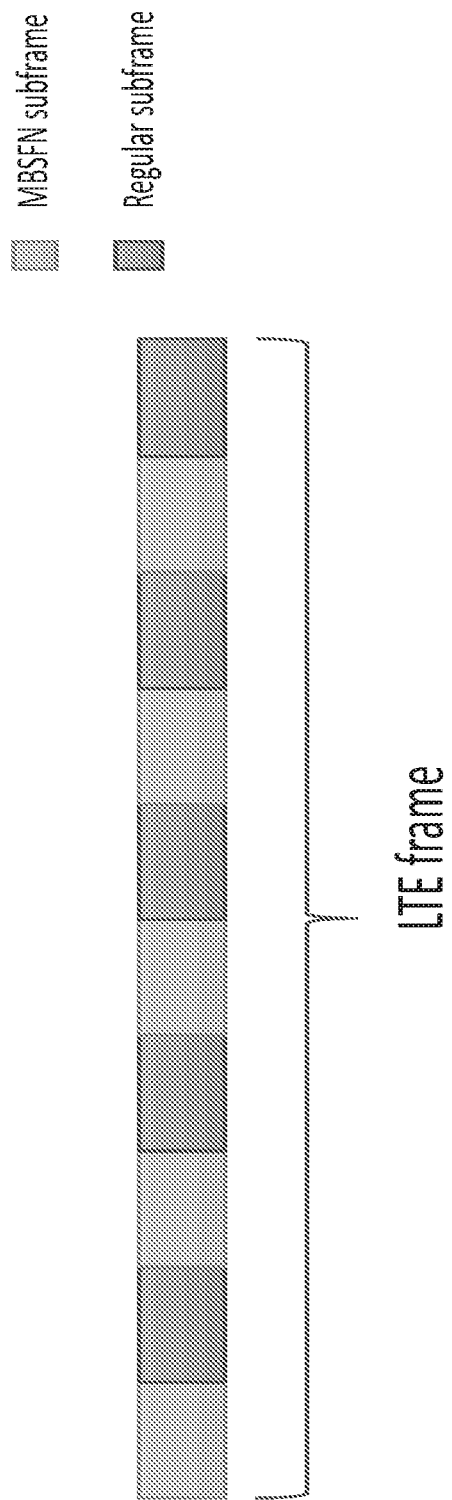
FIG. 17 is an example illustration of LTE frame with MBSFN sub-frames and regular sub-frames.

In another embodiment, MBSFN sub-frames are scheduled using the corresponding field in the LTE control channel, in order to reduce the amount of reference signals in the sub-frame period. In this configuration, each LTE frame contains one or more MBSFN sub-frames as well as regular LTE sub-frames. A possible configuration of an LTE frame alternating MBSFN subframes and regular subframes is shown in FIG. 17. Other configurations with different number and position of MBSFN subframes can also be employed.

4.3.2.1 LTE Signaling

User data for UEs utilizing LTE signaling is only transmitted in regular sub-frames. No users are scheduled in MBSFN sub-frames.

4.3.2.1.1 Broadcast Signals

During regular sub-frames, all LTE broadcast signals are transmitted normally, as described in Embodiment 1, while during MBSFN sub-frames only broadcast signals in the control region are transmitted.

4.3.2.1.2 Non-Broadcast Signals

During MBSFN sub-frames, no LTE users are scheduled and all spatial beams use OTFS signaling.
During regular sub-frames, non-broadcast LTE signaling corresponding to scheduled UEs is transmitted as described in Embodiment 1.

4.3.2.2 OTFS Signaling

Figure 18:
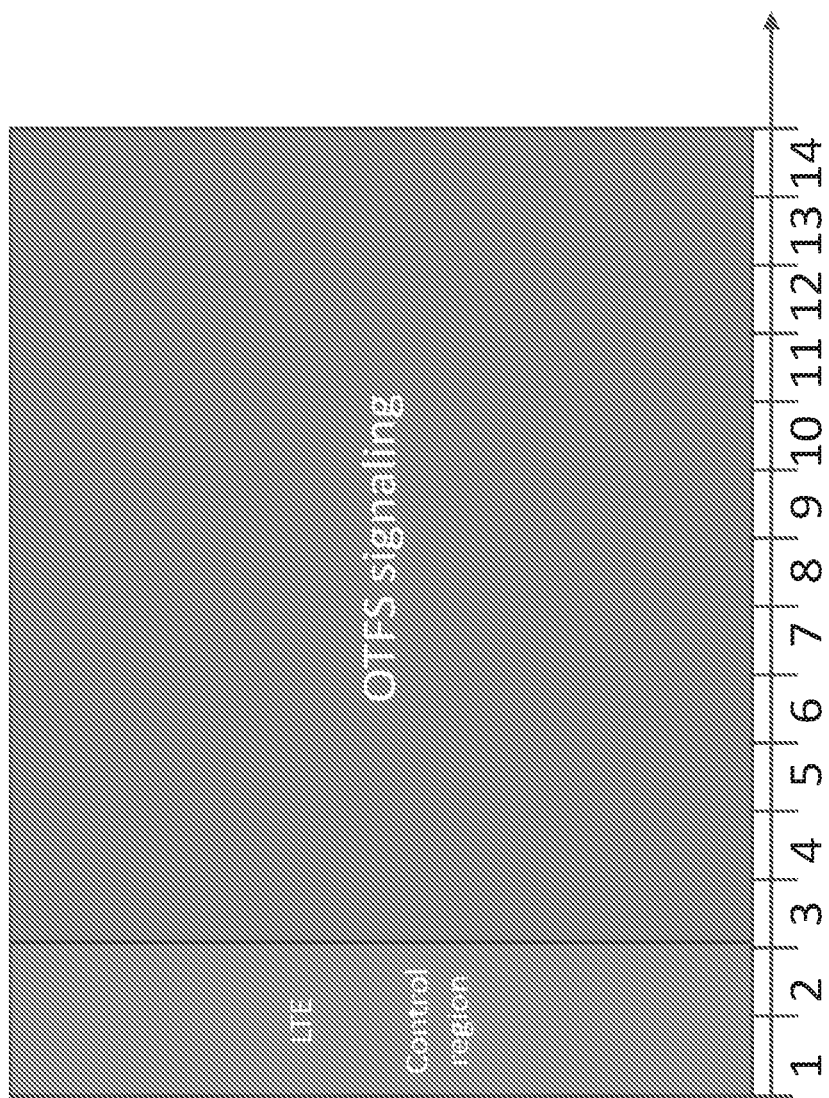
FIG. 18 is an example of OTFS Signaling region for MBSFN subframes.

During regular sub-frames, OTFS signaling may or may not be transmitted. When transmitted, OTFS signaling is according to what is described in Embodiment 1.
During MBSFN sub-frames, the time-frequency region used for OTFS signaling is shown in FIG. 18.

4.3.3 Embodiment 3

Figure 19:
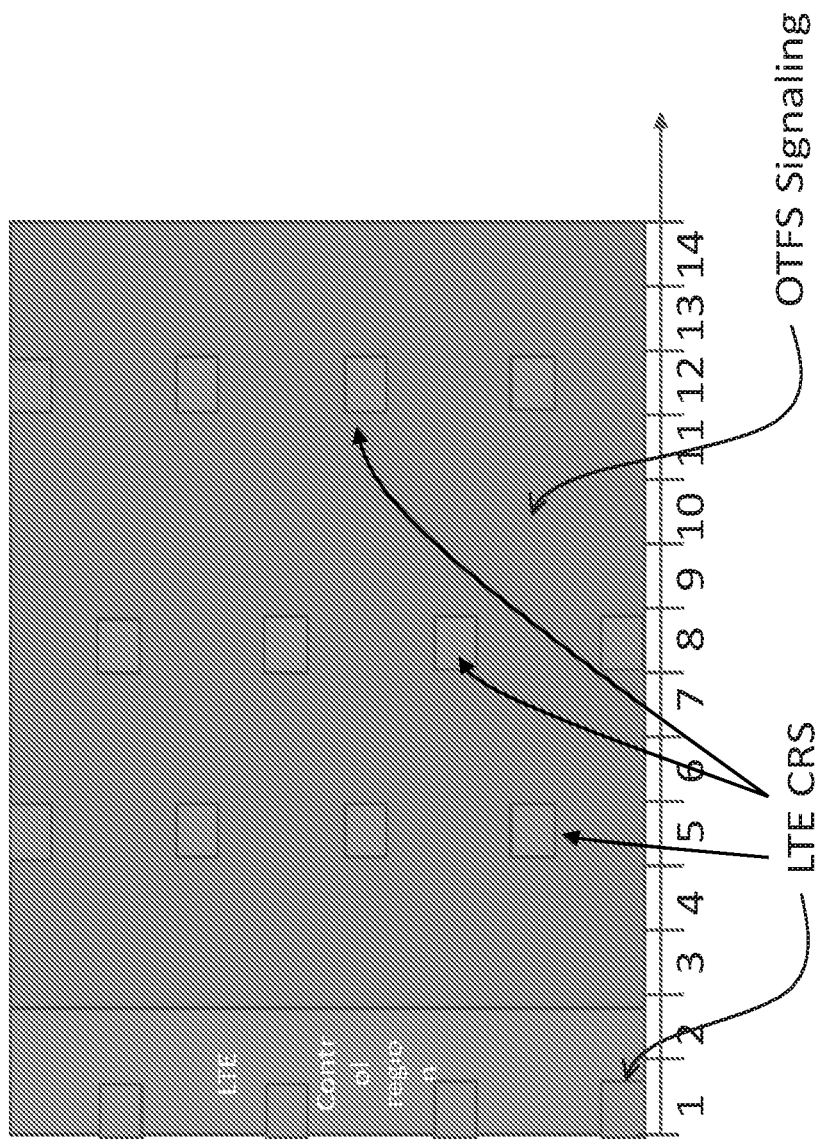
FIG. 19 is an example illustration of LTE frame with ABS sub-frames and regular sub-frames.

In another embodiment, an Almost Blank Subframe (ABS) is scheduled using the corresponding eICIC feature of LTE.
A possible configuration of an LTE frame alternating ABS subframes and regular subframes is shown in FIG. 19. Other configurations with different number and position of ABS subframes can also be employed.

4.3.3.1 LTE Signaling

Using this embodiment, no LTE data signaling is transmitted during ABS subframes, while it is transmitted during regular LTE sub-frames, according to Embodiment 1.

4.3.3.1.1 Broadcast Signals

During an ABS sub-frame, only CRS broadcast signal is transmitted outside of the control region using LTE signaling. During non-ABS subframes, LTE broadcast signaling is transmitted according to Embodiment 1.

4.3.3.1.2 Non-Broadcast Signals

During an ABS sub-frame, no data is transmitted using LTE signaling. During non-ABS subframes, LTE non-broadcast signaling is transmitted according to Embodiment 1.

4.3.3.2 OTFS Signaling

During regular sub-frames, OTFS signaling may or may not be transmitted. When transmitted, OTFS signaling is according to Embodiment 1.

Figure 20:
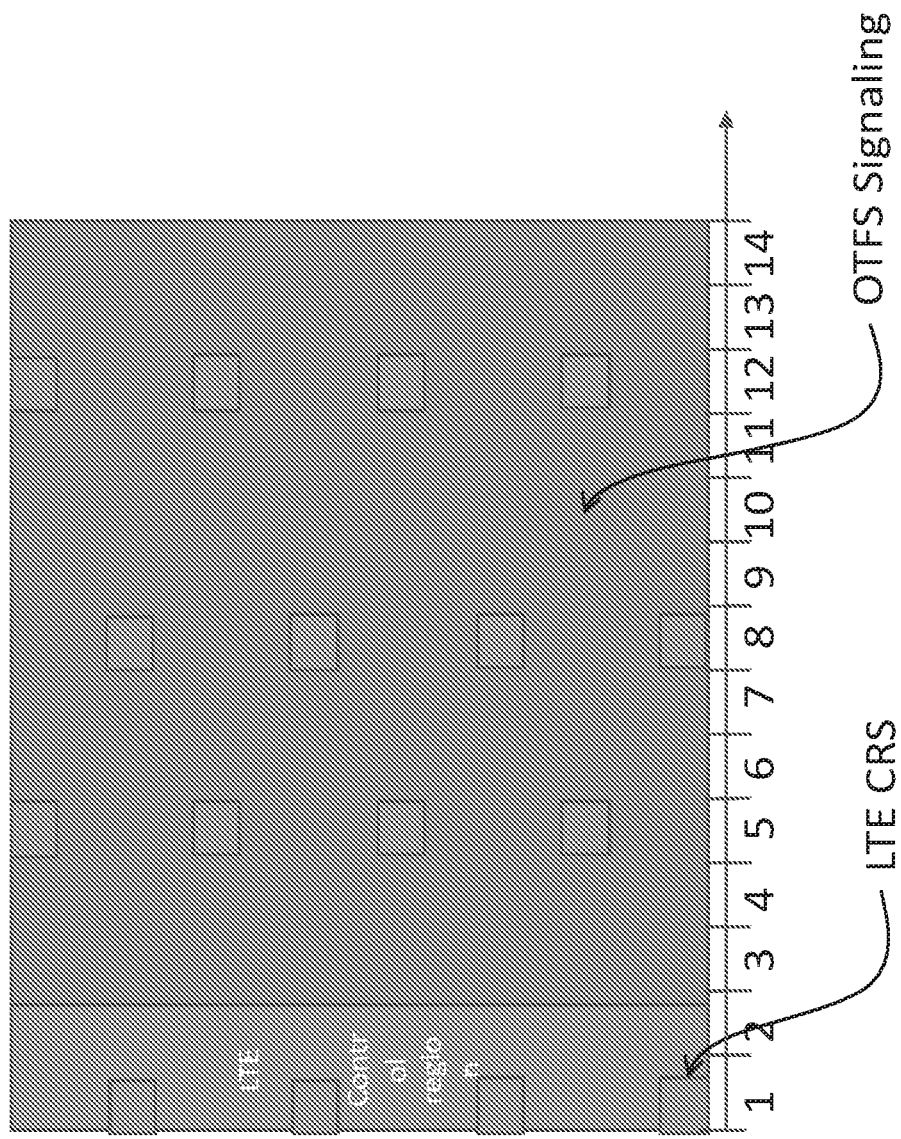
FIG. 20 is an example of OTFS Signaling region for ABS subframes; configuration 1.
Figure 21:
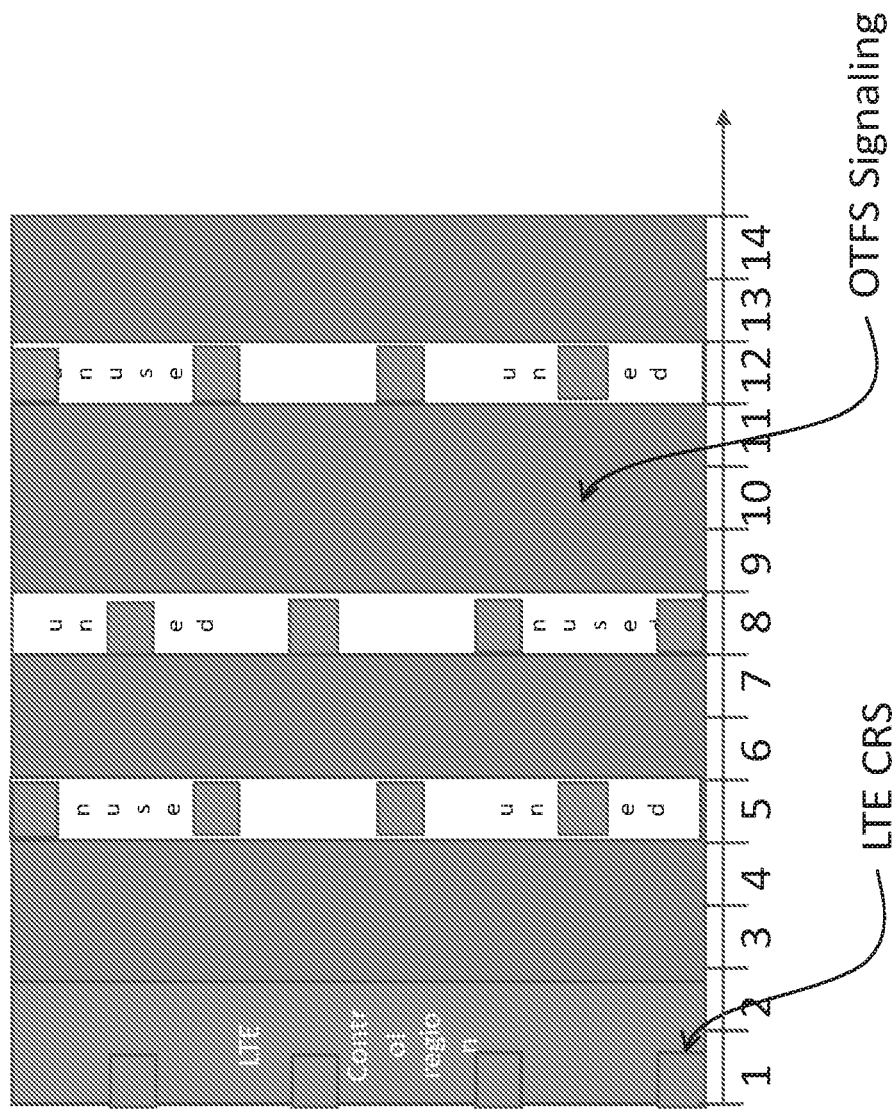
FIG. 21 is an example of OTFS Signaling region for MBSFN subframes; configuration 2.

During MBSFN sub-frames, the time-frequency region used for OTFS signaling during MBSFN subframes is shown in FIG. 20 and FIG. 21 for configurations 1 and 2. In configuration 1 OTFS signaling is configured to use all time-frequency resources outside of the control region, while in configuration 2 OTFS signaling is configured to not use time-frequency columns occupied by CRS.

Figure 22:
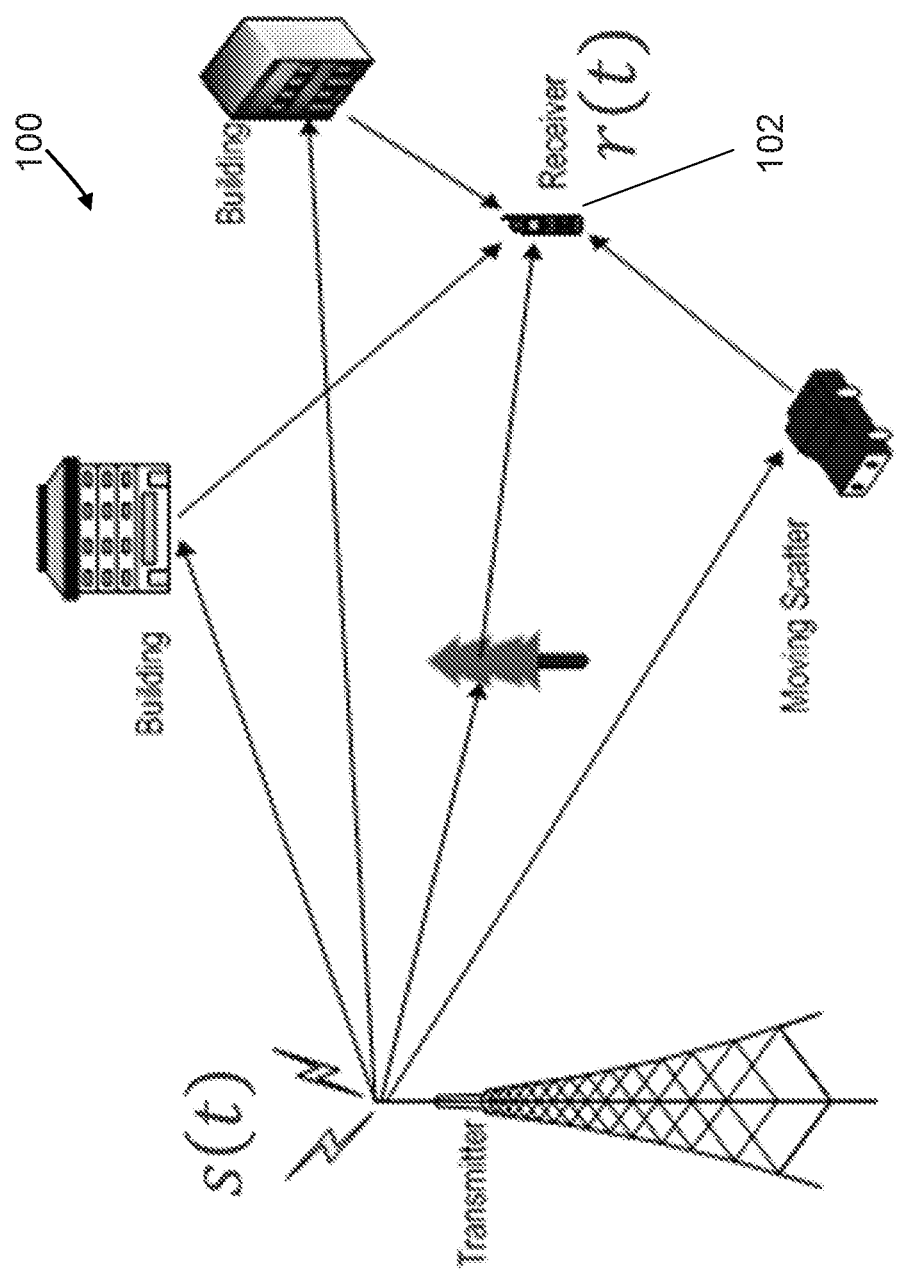
FIG. 22 is an example illustration of a wireless communication network.

FIG. 22 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station).

Figure 23:
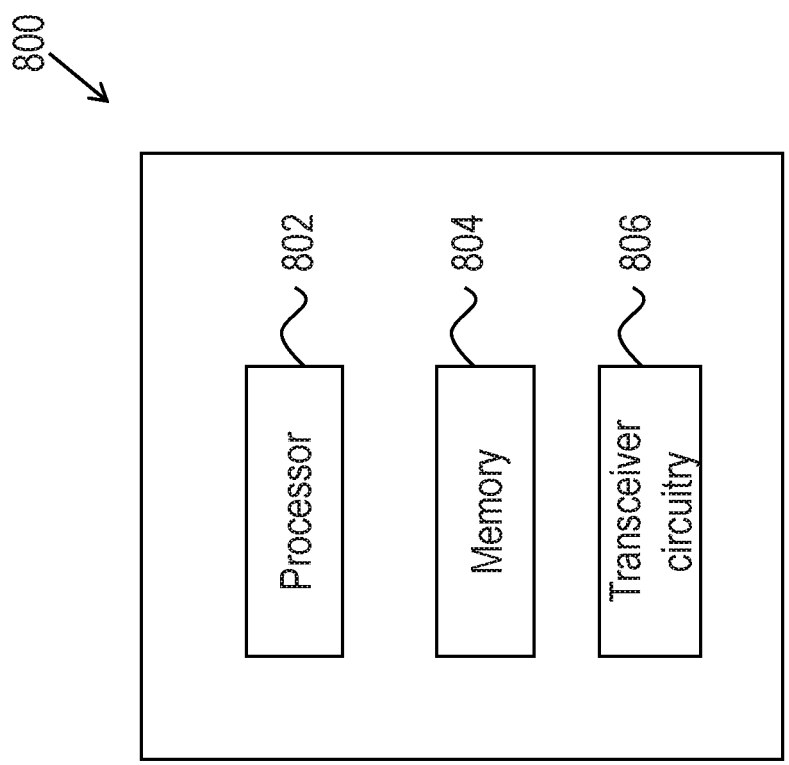
FIG. 23 is an example illustration of a wireless communication apparatus.

FIG. 23 shows an example of a hardware platform 800 that can be used to implement some of the techniques described in the present document. For example, the hardware platform 800 may the various modules described herein. The hardware platform 800 may include a processor 802 that can execute code to implement a method. The hardware platform 800 may include a memory 804 that may be used to store processor-executable code and/or store data. The hardware platform 800 may further include a communication interface 806. For example, the communication interface 806 may implement one or more of the communication protocols (LTE, Wi-Fi, and so on) described herein.

Using the above-described examples, some embodiments may be implemented as follows.

Figure 24:
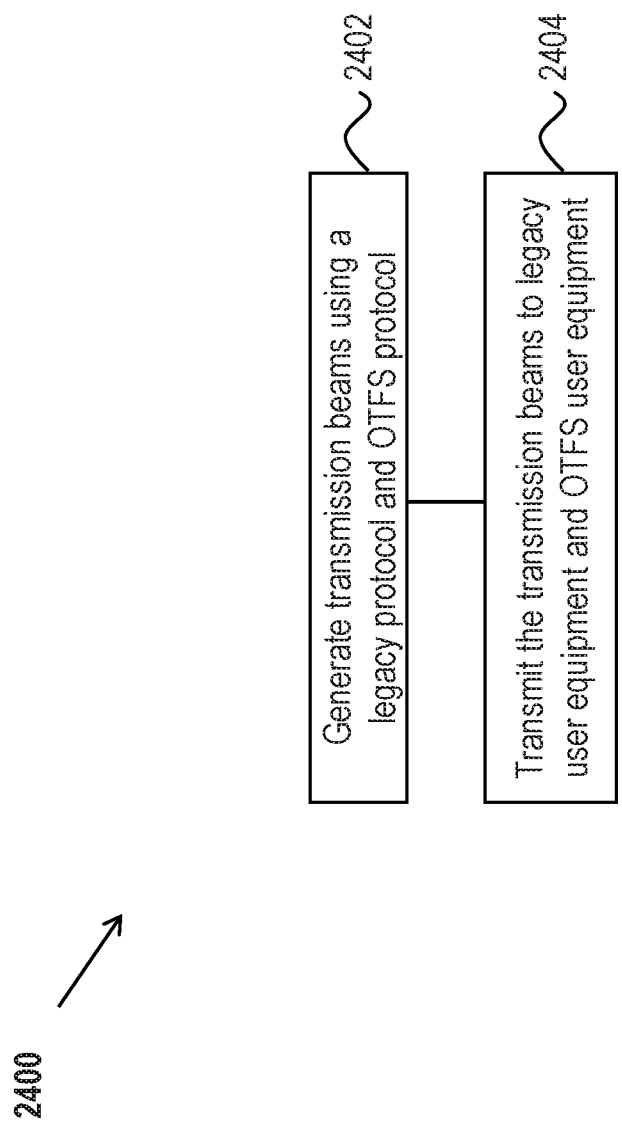
FIG. 24 is an example of a flowchart for a method of wireless communication.

FIG. 24 shows a flowchart for an exemplary method 2400 of wireless communication. The method 2400 may be implemented at a base station in a wireless communication network. The method 2400 includes generating (2402) a number of transmission beams for a first group of user equipment operating using a legacy protocol (e.g., LTE), and a second group of user equipment operating using the OTFS protocol. The transmission beams for the legacy UEs may be generated such that the legacy UEs cannot and do not perceive any changes to the signaling protocol simply due to co-existence with OTFS.

The method 2400 further includes transmitting (2404) a first group of data packets formatted according to the legacy protocol to the first group of user equipment and a second group of data packets formatted according to the OTFS protocol to the second group of user equipment. For example, transmission beam separation may be used to perform the transmissions of the two groups of data packets concurrently or at least partly overlapping in time. The transmission operation 2404 may include precoding and modulating the first group of data packets according to a first modulation scheme for the legacy protocol and precoding and modulating the second group of data packets according to OTFS modulation scheme.

Various embodiments may implement one or more features during implementation of the method 2400. These include:

Transmitting such that at least one of the number of transmission beams includes transmissions for only the first group of user equipment operating using the legacy protocol.

Transmitting such that at least one of the number of transmission beams includes transmissions for only the second group of user equipment operating using the OTFS protocol.

Transmitting such that at least one of the number of transmission beams includes transmission for both the first group of user equipment and the second group of user equipment. Herein, transmitting such that the at least one transmission beam multiplexes transmissions for the first group of user equipment and the second group of user equipment use disjoint time-frequency resources. Alternatively, performing transmissions while sharing the time-frequency resources. For example, some time/frequency resources on a transmission beam may be exclusively used for OTFS transmissions, while other time/frequency resources of the same transmission beams may be exclusively used for legacy transmissions. Alternatively, a scheduler may use all time/frequency resources for OTFS or legacy transmissions, as indicated by the schedules.

Precoding using linear precoding (e.g., FIG. 11).

Precoding using non-linear precoding (e.g., FIG. 12).

Transmitting control and broadcast signals without precoding (e.g., FIG. 11, FIG. 12).

Transmitting first group of data packets using subframes that are all normal subframes of the LTE protocol.

transmitting control signals according to the LTE protocol in a control region of the OFDM scheme, transmitting common reference signals according to the LTE protocol, transmitting cell discovery signals according to the LTE protocol, and transmitting system information blocks according to the LTE protocol.

transmitting signals according to the OTFS protocol using non-broadcast transmission resources of the LTE protocol. This transmission may be performed by signals according to the OTFS protocol are transmitted in symbols 5, 8 and 12 of the LTE protocol using transmission resources as a function of channel reference signal power boosting in the LTE protocol.

transmitting the first group of data packets includes transmitting using normal subframes and refraining from transmitting the first group of data packets using multicast broadcast single frequency network (MBSFN) subframes of the LTE protocol. The transmissions further including transmitting the second group of data packets in the MBSFN subframes in using transmission resources that are non-overlapping with control signal transmissions of the LTE protocol.

transmitting the first group of data packets includes transmitting using normal subframes and refraining from transmitting the first group of data packets using almost blank subframes (ABS) of the LTE protocol. The transmitting further including transmitting the second group of data packets in the ABS in using transmission resources that are non-overlapping with control signal transmissions of the LTE protocol.

Figure 25:
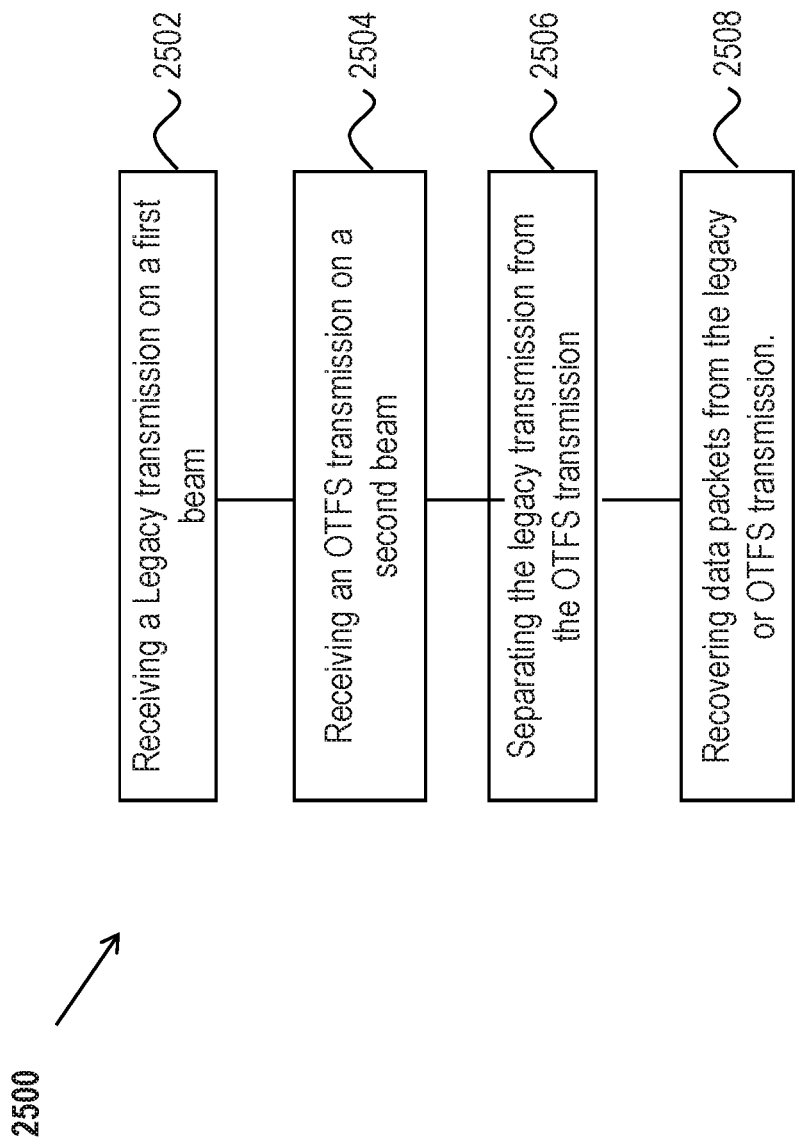
FIG. 25 is an example of a flowchart for another method of wireless communication.

FIG. 25 is a flowchart for an exemplary method 2500 of wireless communication. The method 2500 may be implemented by a user device that implements the OTFS protocol or a user device capable of receiving both OTFS and legacy transmissions.

The method 2500 includes receiving (2502), on a first group of transmission beams, a first set of transmissions conforming to a legacy protocol, receiving (2504), on a second group of transmission beams, a second set of transmissions conforming to the OTFS protocol, separating (2506) the first set of transmissions and the second set of transmissions using spatial signal separation processing, and recovering (2508) data packets from at least the first set of transmissions or the second set of data transmissions.

In some embodiments, the separating operation 2506 may use the successive interference cancellation technique described herein. Alternatively, or in addition, some embodiments may use iterative interference cancellation, as described with respect to FIG. 9. In some embodiments, a same transmission beam may include both LTE and OTFS transmissions. In some embodiments, LTE transmissions and OTFS transmissions may be on spatially separate transmission beams.

In some embodiments, the receiving operation 2504 may include receiving data over all possible transmission resources that exclude transmissions resources allocated to reference signals transmissions according to the legacy protocol and the OTFS protocol and transmission resources allocated to random access transmissions and control channel transmissions according to the legacy protocol.

In some embodiments, a wireless transmission apparatus (e.g., as shown in FIG. 23) may be used to implement any one or more of the above described methods. This apparatus may be a part of a base station or a user device.

In some embodiments, a wireless communication system (e.g., FIG. 4) includes a network node and multiple user devices, wherein at least one user device transmits and receives according to a legacy protocol, at least one user device that transmits and receives according to an orthogonal time frequency space (OTFS) protocol, and at least one user device that transmits and receives using both the legacy and the OTFS protocols.

It will be appreciated that the present document discloses various techniques for allowing simultaneous deployment of OTFS and legacy devices. Such deployments may provide transmission resources for uplink and downlink transmissions of OTFS and legacy signals using transmission beams that are either exclusively used for one or other type of transmissions (thus spatially separating the OTFS and legacy equipment) or using a same transmission beam but separating transmissions in frequency and/or time domain.

5. Overview of OTFS

This section provides a brief overview of OTFS modulation. In a system that uses OTFS transmission protocol, physical layer of transmission may carry signals that are modulated OTFS signals, while layers above the physical layer (e.g., the media access, or MAC, layer) may be identical to the legacy MAC layer.

5.1 Brief Summary

OTFS is a modulation scheme that multiplexes QAM information symbols in a new signal representation called the delay-Doppler representation. In the mathematical literature, the delay-Doppler representation is sometimes referred to as the lattice representation of the Heisenberg group. The structure was later rediscovered by physicists who refer to it as the Zak representation. The delay-Doppler representation generalizes time and frequency representations, rendering OTFS as a far reaching generalization of well known time and frequency modulation schemes such as TDM (Time Division Multiplexing, or single carrier multiplexing) where QAM symbols are multiplexed over consecutive time slots and FDM (Frequency Division Multiplexing, or multi-carrier multiplexing) where QAM symbols are multiplexed over consecutive frequency carriers. From a broader perspective, OTFS establishes a conceptual link between Radar and communication. These aspects of the theory are explained in Sections 5.2 and 5.3.

The OTFS waveforms optimally couple with the wireless channel in a way that captures the physics of the channel, yielding a high-resolution delay-Doppler Radar image of the constituent reflectors. This results in a simple symmetric coupling between the channel and the information carrying QAM symbols. The symmetry manifests itself through three fundamental properties:

Invariance
Separability
Orthogonality

Invariance means that the coupling pattern is the same for all QAM symbols (i.e., all symbols experience the same channel or, put another way, the coupling is translation invariant). Separability (sometimes referred to as hardening) means that all the diversity paths are separated from one another and each QAM symbol experiences all the diversity paths of the channel. Finally, orthogonality means that the coupling is localized, which implies that the QAM symbols remain roughly orthogonal to one another at the receiver. The orthogonality property should be contrasted with conventional PN sequence-based CDMA modulations where every codeword introduces a global interference pattern that affects all the other codewords. The invariance property should be contrasted with TDM and FDM where the coupling pattern vary significantly among different time-frequency coherence intervals. This aspect of the theory is explained in Section 5.6.

5.2 the Delay-Doppler Signal Representation

To understand OTFS from first principles one should revisit the foundations of signal processing which at its core revolves around two basic signal representations. One is the time representation, where a signal is realized as a function of time (superposition of delta functions) and the other is the frequency representation where a signal is realized as a function of frequency (superposition of complex exponentials). These two representations are interchangeable using the Fourier transform.

Figure 26:
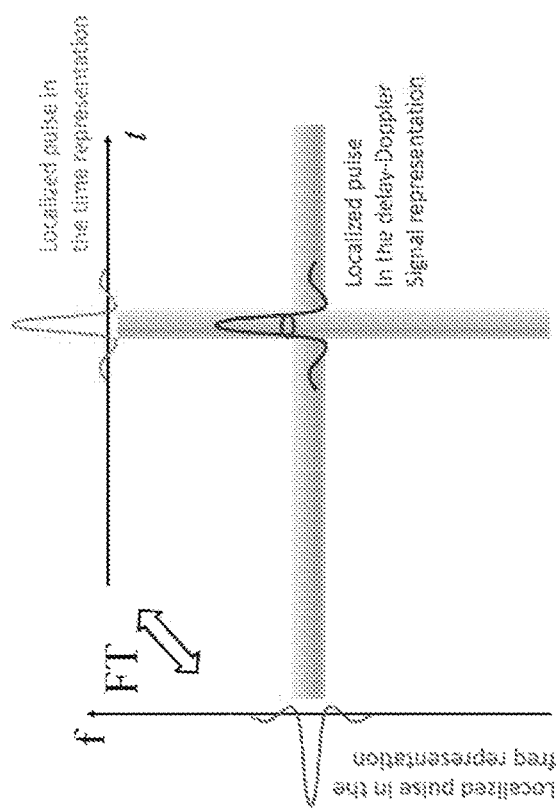
FIG. 26 shows an example of complementarity of time and frequency representations.

The time and frequency representations are complementary to one another. The mathematical expression of this complementarity is captured by the Heisenberg uncertainty principle which states that a signal cannot be simultaneously localized to any desired degree in time and in frequency. Specifically, if a signal is localized in time then it is non localized in frequency and, reciprocally, if a signal is localized in frequency then it is non localized in time, as shown in FIG. 26. This mathematical fact hides a deeper truth. As it turns out, there exists signals which behave as if they are simultaneously localized to any desired degree both in time and in frequency, a property which renders them optimal both for delay-Doppler Radar multi-target detection and for wireless communication (two use cases which turn out to be strongly linked). These special signals are naturally associated with localized pulses in a representation called the delay-Doppler representation. Signals in the delay-Doppler representation are special type of functions on a two-dimensional domain called the delay-Doppler plane whose points are parametrized by two variables (τ, ν) where the first variable is called delay and the second variable is called Doppler.

A variant of OTFS can be architected over an arbitrary multicarrier modulation scheme by means of a two-dimensional (symplectic) Fourier transform between a grid in the delay-Doppler plane and a grid in the reciprocal time-frequency plane. The Fourier relation gives rise to a family of orthogonal 2D basis functions on the time-frequency grid where each of these basis functions can be viewed as a codeword that spreads over multiple tones and multiple multicarrier symbols. This interpretation renders OTFS as a time-frequency spreading technique that generalizes CDMA. This aspect of the theory will be explained in Section 5.7.

Figure 27:
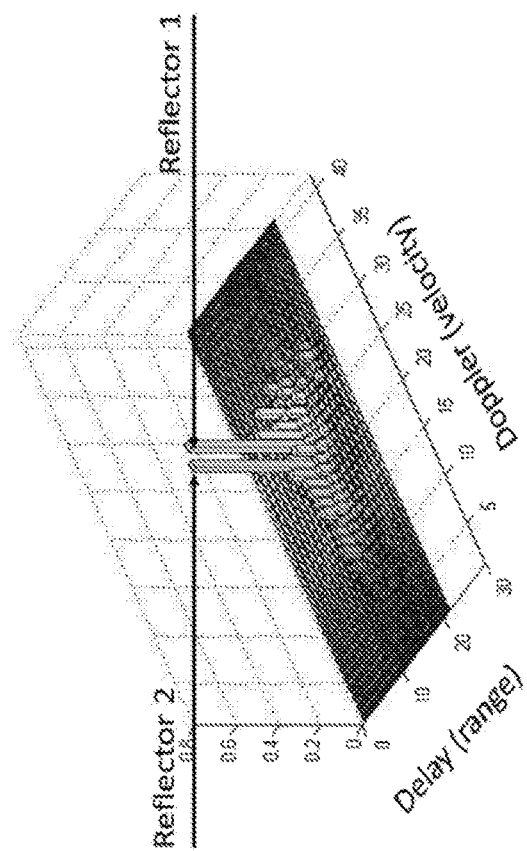
FIG. 27 shows an example of delay-Doppler impulse response.

The delay-Doppler variables are commonly used in Radar and communication theory. In Radar, they are used to represent and separate moving targets by means of their delay (range) and Doppler (velocity) characteristics. In communication, they are used to represent channels by means of a superposition of time and frequency shift operations. The delay-Doppler channel representation is particularly meaningful in wireless communication, where it coincides with the delay-Doppler Radar image of the constituent reflectors. FIG. 27, shows an example of the delay-Doppler representation of a specific channel which is composed of two main reflectors which share similar delay (range) but differ in their Doppler characteristic (velocities).

Figures 28, 29:
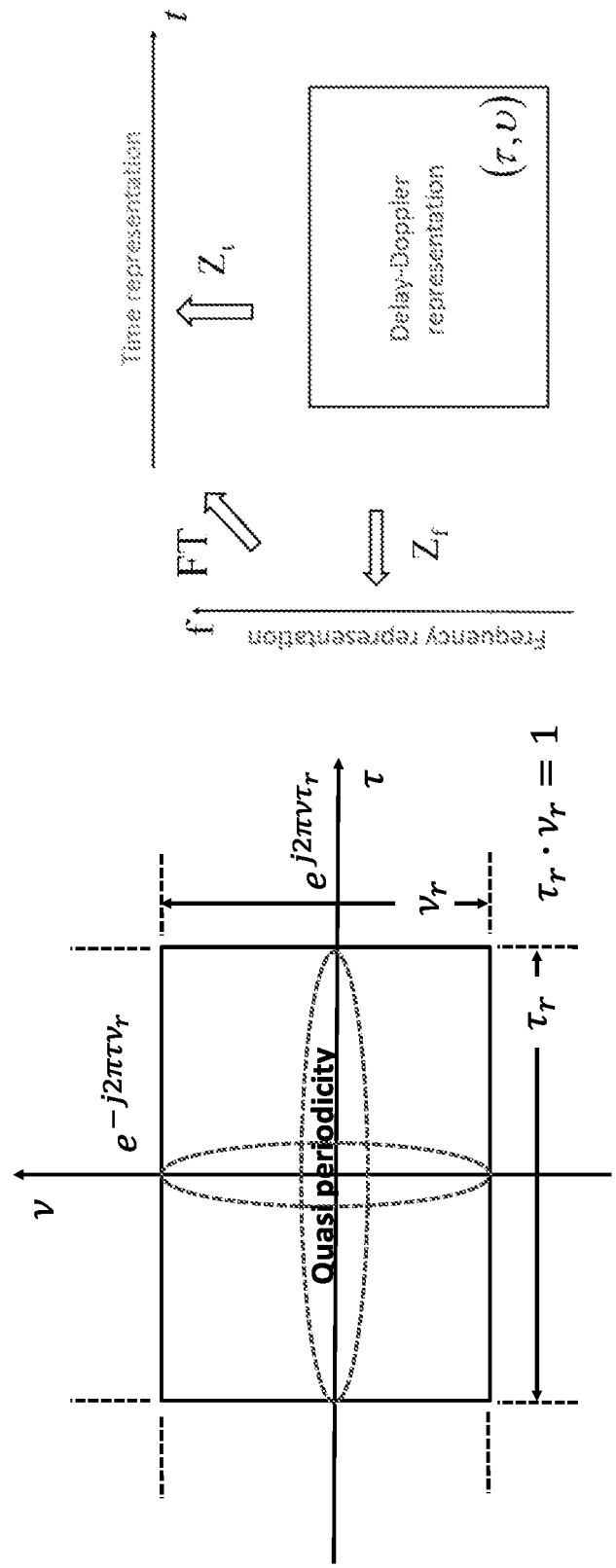
FIG. 28 shows an example of delay-Doppler quasi periodicity.
FIG. 29 shows an example of delay-Doppler representation.

The use of the delay-Doppler variables to represent channels is well known. Less known is the fact that these variables can also be used to represent information-carrying signals in a way that is harmonious with the delay-Doppler representation of the channel. The delay-Doppler signal representation is mathematically subtler and requires the introduction of a new class of functions called quasi-periodic functions. To this end, we choose a delay period $\tau_r$ and a Doppler period $\nu_r$ satisfying the condition $\tau_r \cdot \nu_r = 1$ and thus defining a box of unit area, as shown in FIG. 28. A delay-Doppler signal is a function $\phi(\tau, \nu)$ that satisfies the following quasi-periodicity condition:

$$\phi(\tau+n\tau_r, \nu+m\nu_r) = e^{j2\pi(n\nu\tau_r - m\tau\nu_r)}\phi(\tau,\nu)$$

which means that the function is periodic up to a multiplicative phase, i.e., the value of the function acquires a phase factor equal to $e^{j2\pi\nu\tau_r}$ for every traversal of delay period $\tau_r$ and, reciprocally, acquires a phase factor equal to $e^{-j2\pi\tau\nu_r}$ for every traversal of Doppler period $\nu_r$. To summarize, there are three fundamental ways to represent a signal. The first way is as a function of time, the second way is as a function of frequency and the third way is as a quasi-periodic function of delay and Doppler. These three alternative representations are interchangeable by means of canonical transforms, as shown in FIG. 29. The conversion between the time and frequency representations is carried through the Fourier transform. The conversion between the delay-Doppler and the time and frequency representations is carried by the Zak transforms $Z_t$ and $Z_f$ respectively. The Zak transforms are realized by means of periodic Fourier integration formulas:

$$Z_t(\phi) = \int_0^{\nu_r} e^{j2\pi\tau\nu} \phi(t,\nu) d\nu$$

$$Z_f(\phi) = \int_0^{\tau_r} e^{-j2\pi\tau\nu} \phi(\tau,f) d\tau$$

In words, the Zak transform to the time representation is given by the inverse Fourier transform along a Doppler period and reciprocally, the Zak transform to the frequency representation is given by the Fourier transform along a delay period. We note that the quasi-periodicity condition is necessary to for the Zak transform to be a one-to-one equivalence between functions on the one-dimensional line and functions on the two-dimensional plane. Without it, a signal on the line will admit infinitely many delay-Doppler representations.

5.3 The General Framework of Signal Processing

Figures 30, 31:
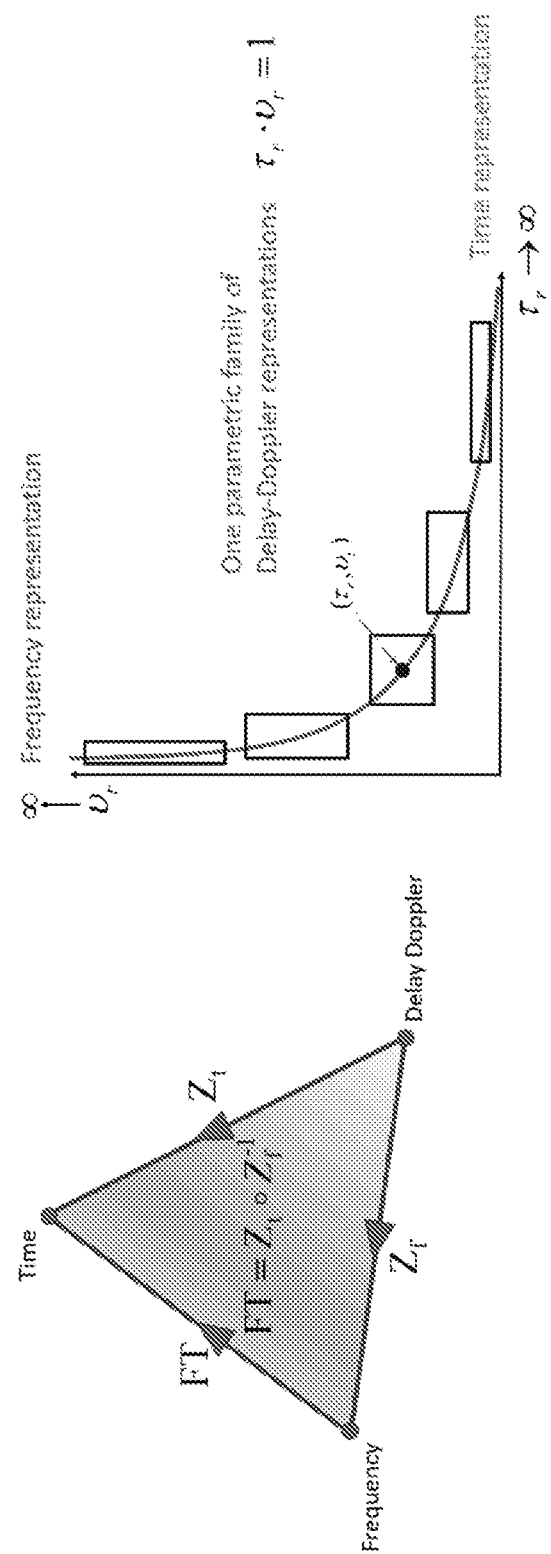
FIG. 30 shows a fundamental triangle.
FIG. 31 shows an example of delay-Doppler parametric representation.

The general framework of signal processing consists of three signal representations—(1) time, (2) frequency, and (3) delay-Doppler, interchangeable by means of canonical transforms. The setting can be neatly organized in a form of a triangle, as shown in FIG. 30. The nodes of the triangle represent the three representations and the edges represent the canonical transformation rules converting between them.

An important property of this diagram is that the composition of any pair of transforms is equal to the remaining third one. In other words, traversing along the edges of the triangle results in the same answer no matter of which path is chosen. In particular, one can write the Fourier transform as a composition of two Zak transforms:

$$FT = Z_t \circ Z_f^{-1}$$

This means that instead of transforming from frequency to time using the Fourier transform one can alternatively transform from frequency to delay-Doppler using the inverse Zak transform $Z_f^{-1}$ and then from delay-Doppler to time using the Zak transform $Z_t$. The above decomposition yields an alternative algorithm for computing the Fourier transform which turns out to coincide with the fast Fourier transform algorithm discovered by Cooley-Tukey. More accurately, the FFT algorithm amounts to a decomposition of the Fourier transform into a sequence of intermediate Zak transforms converting between the points of a polygonal decomposition of the delay-Doppler curve, explained below. This striking fact is an evidence that the delay-Doppler representation silently plays an important role in classical signal processing.

Going up one level of abstraction, we note that the delay-Doppler representation is not unique but depends on a choice of a pair of periods ($\tau_r$, $\nu_r$) satisfying the relation $\tau_r \cdot \nu_r = 1$. This implies that there is a continuous family of delay-Doppler representations, corresponding to points on the hyperbola $\nu_r = 1/\tau_r$, as shown in FIG. 31. It is interesting to study what happens in the limits when the variable $\tau_r \to \infty$ and when the variable $\nu_r \to \infty$. In the first limit the delay period is extended at the expense of the Doppler period contracting, thus converging in the limit to a one-dimensional representation coinciding with the time representation. Reciprocally, in the second limit, the Doppler period is extended at the expense of the delay period contracting, thus converging in the limit to a one-dimensional representation coinciding with the frequency representation. Hence, the time and frequency representations can be viewed as limiting cases of the more general family of delay-Doppler representations.

All delay-Doppler representations are interchangeable by means of appropriately defined Zak transforms which satisfy commutativity relations generalizing the triangle relation discussed beforehand. This means that the conversion between any pair of representations along the curve is independent of which polygonal path is chosen to connect between them. On a philosophical note, the delay-Doppler representations and the associated Zak transforms constitute the primitive building blocks of signal processing giving rise, in particular, to the classical notions of time and frequency and the associated Fourier transformation rule.

5.4 OTFS Modulation Scheme

Communication theory is concerned with transferring information through various physical media such as wired and wireless. The vehicle that couples a sequence of information-carrying QAM symbols with the communication channel is referred to as a modulation scheme. The channel-symbol coupling thus depends both on the physics of the channel and on the modulation carrier waveforms. Consequently, every modulation scheme gives rise to a unique coupling pattern which reflects the way the modulation waveforms interact with the channel.

Classical communication theory revolves around two basic modulation schemes which are naturally associated with the time and frequency signal representations. The first scheme multiplexes QAM symbols over localized pulses in the time representation and it is called TDM (Time Division Multiplexing). The second scheme multiplexes QAM symbols over localized pulses in the frequency representation (and transmits them using the Fourier transform) and it is called FDM (Frequency Division Multiplexing).

Figure 32:
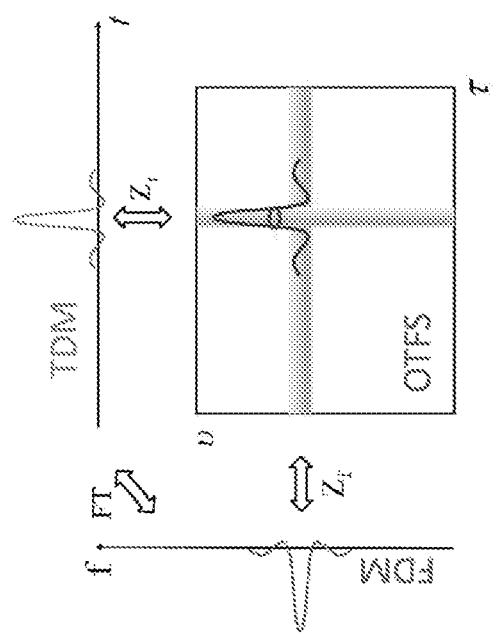
FIG. 32 illustrates a Delay-Doppler modulation scheme.

It is interesting to convert the TDM and FDM carrier pulses to the delay-Doppler representation using the respective inverse Zak transforms. Converting the TDM pulse reveals a quasi-periodic function that is localized in delay but non localized in Doppler. Converting the FDM pulse reveals a quasi-periodic signal that is localized in Doppler but non localized in delay. The polarized non-symmetric delay-Doppler representation of the TDM and FDM pulses suggests a superior modulation based on symmetrically localized signals in the delay-Doppler representation, as shown in FIG. 32. This new modulation scheme is referred to as OTFS, which stands for Orthogonal Time Frequency and Space.

There is an infinite family of OTFS modulation schemes corresponding to different delay-Doppler representations parameterized by points of the delay-Doppler curve (as shown in FIG. 30). The classical time and frequency modulation schemes, TDM and FDM, appear as limiting cases of the OTFS family, when the delay and Doppler periods approach infinity, respectively. The OTFS family of modulation schemes smoothly interpolate between time and frequency division multiplexing.

5.5 The OTFS Carrier Waveform

Up to this point we have used the abstract language of domains, signal representations and transforms to describe OTFS. In this section, we give an explicit description of the OTFS carrier waveform as a function of time. To this end, we choose a two-dimensional grid in the delay-Doppler plane specified by the following parameters:

$$\Delta\tau = \frac{\tau_r}{N}$$
$$\Delta\upsilon = \frac{\upsilon_r}{M}$$

Figure 33:
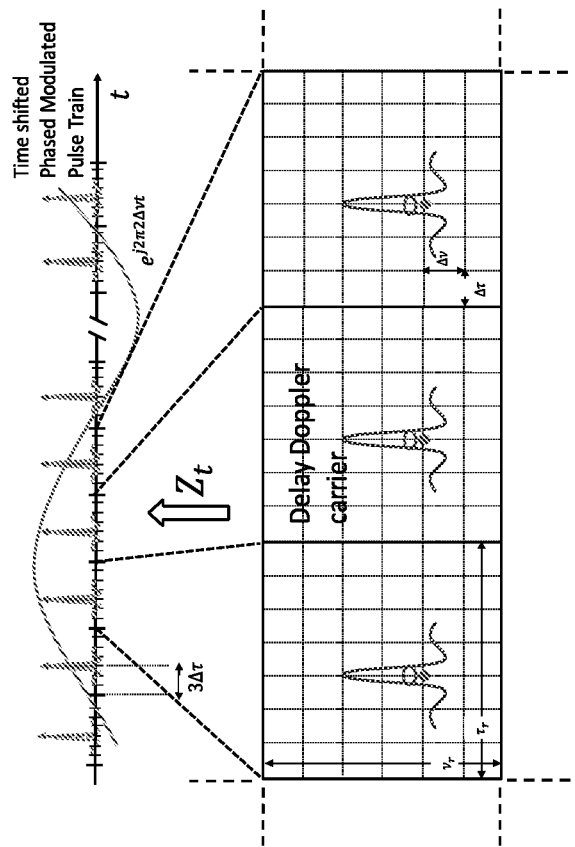
FIG. 33 shows an example of OTFS carrier waveform.

The grid defined in this way consists of N points along the delay period, with spacing $\Delta\tau$ and M points along the Doppler period, with spacing $\Delta\upsilon$, resulting with a total of NM grid points inside the fundamental rectangular domain. Next, we position a localized pulse, $w_{n,m}$, in the delay-Doppler representation at a specific grid point $(n\Delta\tau, m\Delta\upsilon)$. We note that the pulse is only localized inside the boundaries of the fundamental domain (enclosed by the delay-Doppler periods) and repeats itself quasi-periodically over the whole delay-Doppler plane, as shown in FIG. 33 with n=3 and m=2. We assume $w_{n,m}$ is a product of two one-dimensional pulses:

$$w_{n,m}(\tau,\upsilon)=w_\tau(\tau-n\Delta\tau)\cdot w_\upsilon(\upsilon-m\Delta\upsilon)$$

where the first factor is localized along delay (time) and the second factor is localized along Doppler (frequency). In a sense, the delay-Doppler two-dimensional pulse is a stitching of the one-dimensional TDMA and OFDM pulses. To describe the structure of $w_{n,m}$ in the time representation we need to compute the Zak transform:

$$Z_t(w_{n,m})$$

A direct verification using the formula of the Zak transform reveals that the resulting waveform is a pulse train shifted in time and in frequency, where the shift in time is equal to the delay coordinate $n\Delta\tau$ and the shift in frequency is equal to the Doppler coordinate $m\Delta v$. Locally, the shape of each pulse is related to the delay pulse, $w_\tau$, and, globally, the shape of the total train is related to the Fourier transform of the Doppler pulse, $w_\upsilon$. Moving the grid point along delay causes each pulse in the train to shift along time by the same displacement, resembling TDM. Reciprocally, moving the grid point along Doppler causes a shift in frequency of the whole train by the same frequency displacement, resembling OFDM. In other words, the local structure of the OTFS carrier waveform resembles that of TDM while the global structure resembles that of FDM.

5.6 The Delay-Doppler Channel Symbol Coupling

The wireless channel is governed by simple physics. It is composed of a collection of specular reflectors, some of which are static and some of which are moving. The transmitted waveform propagates through the medium and bounces off each reflector. The signal that arrives at the receiver is a superposition of the direct signal and the reflected echoes. Each of the reflected echoes arrives at the receiver at a delayed time (multipath effect) and possibly also shifted in frequency (Doppler effect) due to the relative velocity between the reflector and the transmitter/receiver. The channel physics is mathematically modeled through the delay-Doppler impulse response where each tap represents a cluster of reflectors with specific delay and Doppler characteristics, as shown in FIG. 29. Our goal in this section is to describe the channel-symbol coupling (CSC for short) between the wireless channel and the OTFS carrier waveform given by a localized pulse in the delay-Doppler representation. As a motivation, we first discuss the channel-symbol coupling of the TDM and FDM pulses.

Figure 34:
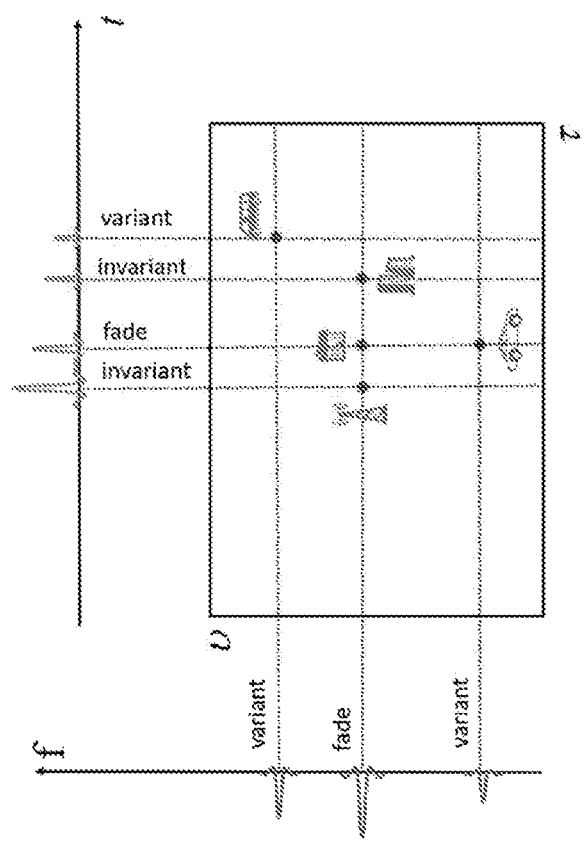
FIG. 34 shows example of TDM and FDM channel-symbol couplings.

Transmitting a localized TDM pulse in the time representation gives rise at the receiver to a configuration of echoes which appear at specific time displacements which corresponds to the multipath delays imposed by the various reflectors. The phase and amplitude of each echo depend on the initial position of the transmitted pulse and might change significantly among different coherence time intervals—a phenomenon referred to as time selectivity. There are two mechanisms involved. The phase of the echo changes due to the Doppler effect and the amplitude of the echo changes due to destructive superposition of numerous reflectors sharing the same delay but differing in Doppler, resulting from the inability of the TDM pulse to separate reflectors along Doppler. In FIG. 34, counting the TDM echoes from left to right we see that the first and third echoes are due to static reflectors hence are time invariant, the fourth echo is due to moving reflector thus is time varying and the second echo is due to superposition of two reflectors, one of which is moving thus is fading.

Reciprocally, transmitting a localized FDM pulse in the frequency representation gives rise at the receiver to a configuration of echoes at specific frequency displacements which correspond to the Doppler shifts induced by the various reflectors. The phase and amplitude of each echo depends on the initial position of the transmitted pulse and might change significantly among different coherence frequency intervals—a phenomenon referred to as frequency selectivity. The phase of the echo changes due to the multipath effect and the amplitude of the echo changes due to destructive superposition of numerous reflectors sharing the same Doppler but perhaps differing in delay, resulting from the inability of the FDM pulse to separate reflectors along delay. For example, in FIG. 34, counting the received FDM echoes from bottom up, we see that the first and third echoes are frequency varying and the second echo is due to superposition of three static reflectors thus is fading.

Figure 35:
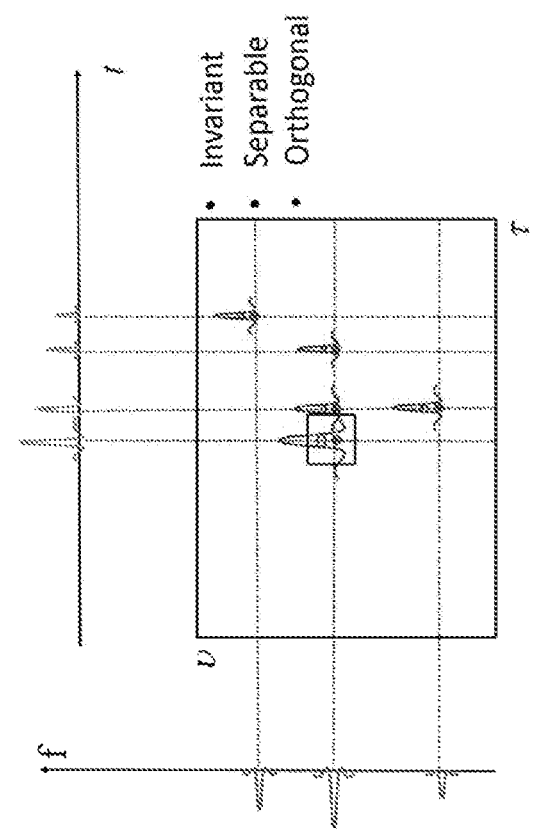
FIG. 35 illustrates an example of Delay-Doppler channel-symbol coupling.

Transmitting a localized OTFS pulse in the delay-Doppler representation gives rise at the receiver to a configuration of echoes that appear at specific delay-Doppler displacements, which corresponds to the delay and Doppler shifts induced by the various reflectors, as shown in FIG. 35. In contrast to the previous two cases, the following properties now hold:

CSC invariance: the phase and amplitude of the delay-Doppler echoes are independent of the location of the original pulse inside the fundamental domain, since the delay and Doppler periods are smaller than the coherence time and bandwidth of the channel respectively.

CSC separability: all the reflections are separated from one another along their delay and Doppler characteristics, hence their effects do not add up destructively and there is no loss of energy on the QAM symbol level.

CSC orthogonality: the received echoes are confined to a small rectangular box around the transmitted pulse with dimensions equal the delay and Doppler spread of the channel which are much smaller than the outer delay and Doppler periods. As result, when two transmit pulses are geometrically separated at the transmitter they will remain orthogonal at the receiver.

An alternate way to express the OTFS channel-symbol coupling is as a two-dimensional convolution between the delay-Doppler impulse response and the QAM symbols. The precise mathematical description of the CSC is by means of operation called twisted convolution (also called Heisenberg convolution) of the delay-Doppler impulse response with the QAM symbols. This can be seen in FIG. 36, which shows numerous delta functions (representing QAM symbols) convolved with the delay-Doppler impulse response of the channel.

5.6 MultiCarrier Interpretation of OTFS

In this section, we describe a variant of OTFS that is more adapted to the classical multicarrier formalism of time-frequency grids and filter-banks and illuminates aspects of OTFS that are not apparent from the Zak definition. One consequence of the new definition is that OTFS can be viewed as a time-frequency spreading scheme composed of a collection of two-dimensional basis-functions (or codewords) defined over a reciprocal time-frequency grid. Another consequence is that OTFS can be architected as a simple pre-processing step over an arbitrary multicarrier modulation such as OFDM. The new definition is based on Fourier duality relation between a grid in the delay-Doppler plane and a reciprocal grid in the time-frequency plane.

The delay-Doppler grid consists of N points along delay with spacing $\Delta\tau=\tau_r/N$ and M points along Doppler with spacing $\Delta\upsilon=\upsilon_r/M$ and the reciprocal time-frequency grid consists of N points along frequency with spacing $\Delta f=1/\tau_r$ and M points along time with spacing $\Delta t=1/\upsilon_r$. The two grids are shown in FIG. 35. The parameter $\Delta t$ is the multicarrier symbol duration and the parameter $\Delta f$ is the subcarrier spacing. The time-frequency grid can be interpreted as a sequence of M multicarrier symbols each consisting of N tones or subcarriers. We note that the bandwidth of the transmission $B=M\Delta f$ is inversely proportional to the delay resolution $\Delta\tau$ and the duration of the transmission $T=M\Delta t$ is inversely proportional to the Doppler resolution $\Delta\tau$. The Fourier relation between the two grids is realized by a variant of the two-dimensional finite Fourier transform called the finite symplectic finite Fourier transform (SFFT for short). The SFFT sends an N×M delay-Doppler matrix $x(n\Delta\tau, m\Delta\upsilon)$ to a reciprocal M×N time-frequency $X(m'\Delta t, n'\Delta f)$ via the following summation formula:

$$X(m'\Delta t, n'\Delta f) = \sum_{n=0}^{N-1}\sum_{m=0}^{M-1} e^{j2\pi\left(\frac{m'm}{M} - \frac{n'n}{N}\right)} x(n\Delta\tau, m\Delta\upsilon)$$

where the term "symplectic" refers to the specific coupling form m'm/M−n'n/N inside the exponent. One can easily verify that the SFFT transform is equivalent to an application of an N-dimensional FFT along the columns of the matrix x(n, m) in conjunction with an M-dimensional IFFT along its rows.

Figure 36:
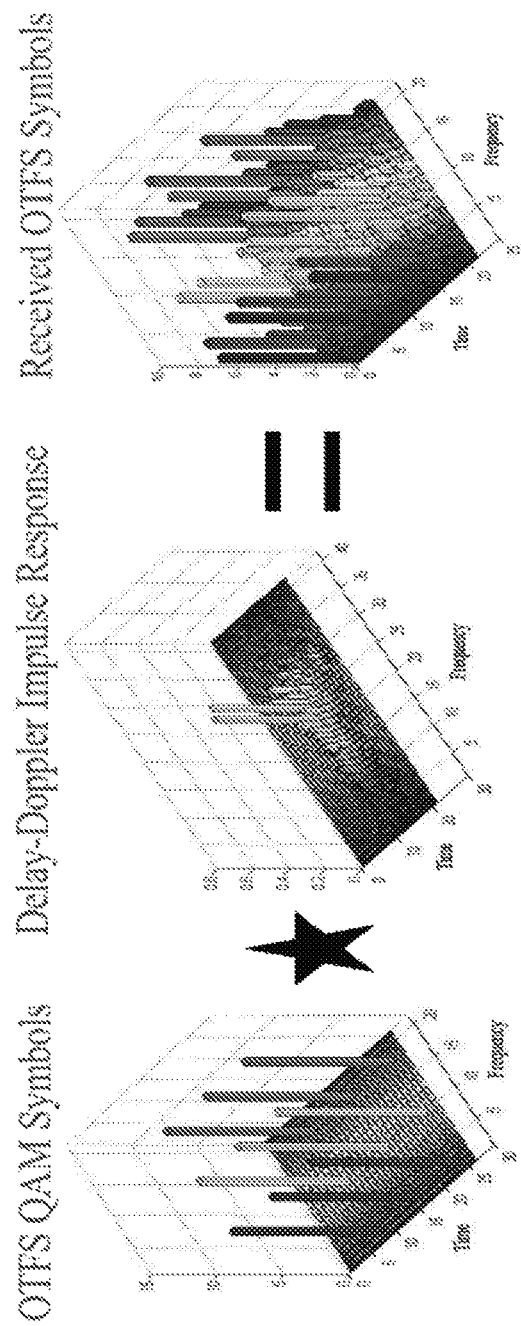
FIG. 36 shows an example of 2D channel convolution.
Figure 37:
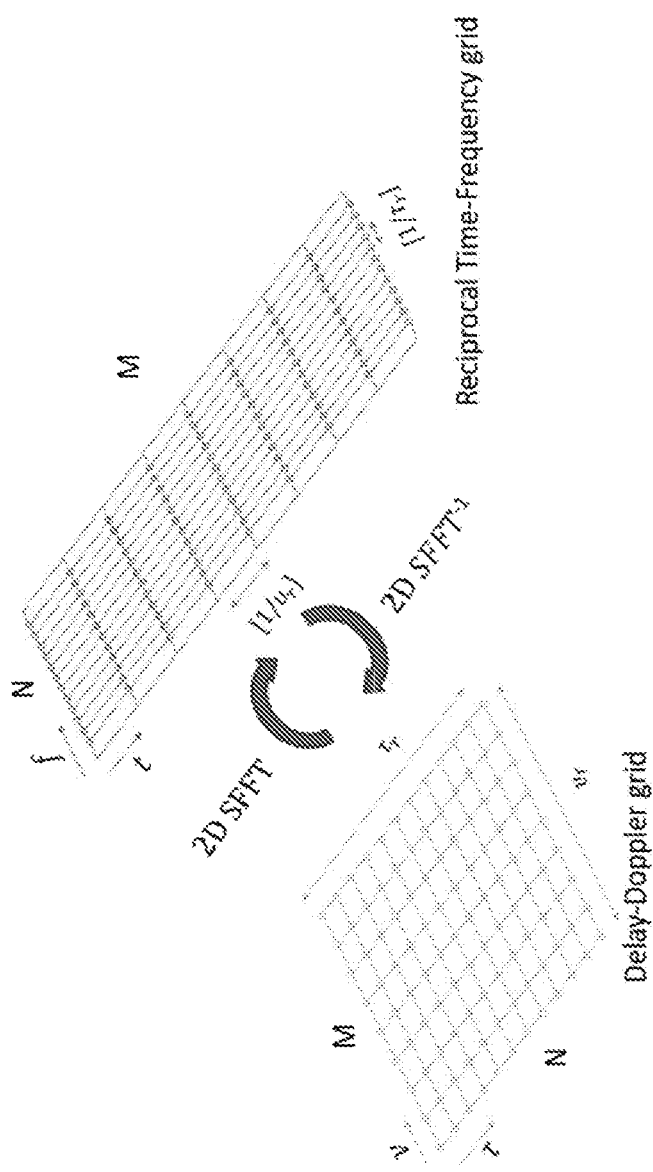
FIG. 37 illustrates symplectic Fourier duality.
Figure 38:
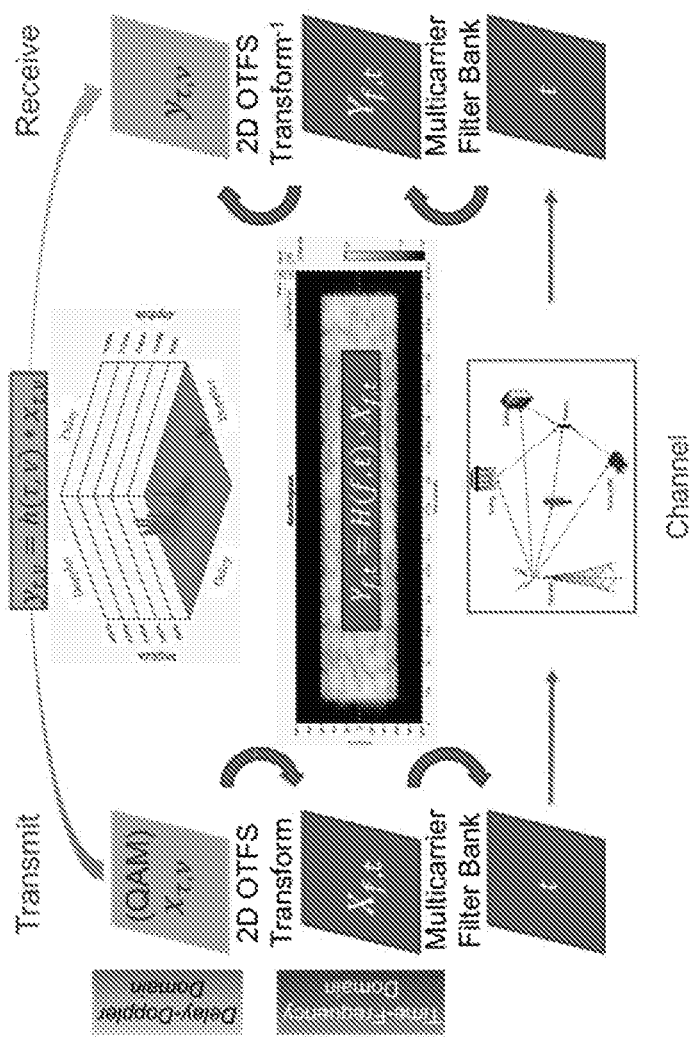
FIG. 38 shows examples of multicarrier OTFS Processing Steps.

The multicarrier interpretation of OTFS is the statement that the Zak transform of an N×M delay-Doppler matrix can be computed alternatively by first transforming the matrix to the time-frequency grid using the SFFT and then transforming the resulting reciprocal matrix to the time domain as a sequence of M multicarrier symbols of size N through a conventional multicarrier transmitter, i.e., IFFT transform of the columns. Hence, using the SFFT transform, the OTFS transceiver can be overlaid as a pre- and post-processing step over a multicarrier transceiver. The multicarrier transceiver of OTFS is depicted in FIG. 36 along with a visual representation of the doubly selective multiplicative CSC in the time-frequency domain and the corresponding invariant convolutive delay-Doppler CSC.

Figure 39:
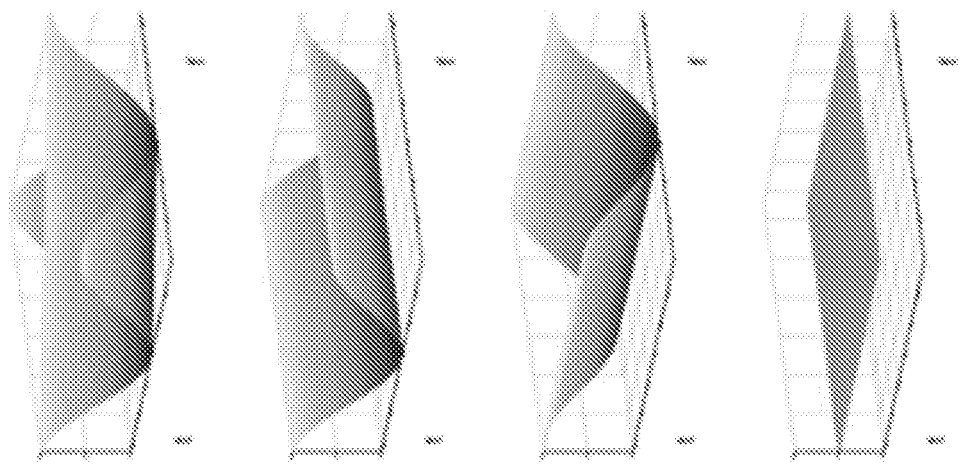
FIG. 39 shows examples of OTFS Time-Frequency Basis Functions.
Figure 39:
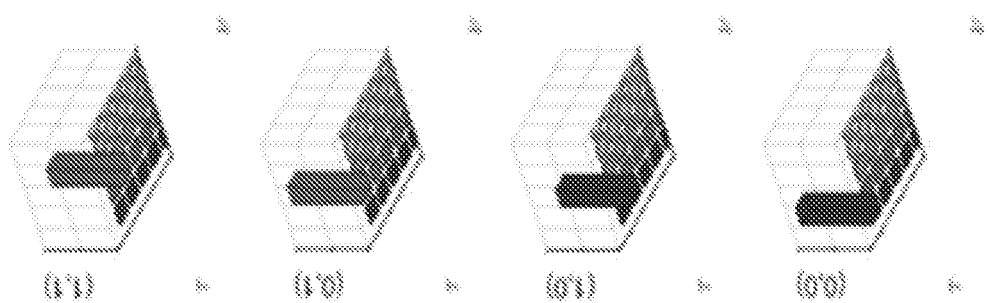

The multicarrier interpretation casts OTFS as a time-frequency spreading technique where each delay-Doppler QAM symbol x(nΔτ, mΔυ) is carried over a two-dimensional spreading 'code' or sequence on the time-frequency grid, given by the following symplectic exponential function:

$$\psi_{n,m}(m'\Delta t, n'\Delta f) = e^{j2\pi\left(\frac{mn'}{M} - \frac{nn'}{N}\right)}$$

where the slope of this function along time is given by the Doppler coordinate mΔυ) and the slope along frequency is given by the delay coordinate nΔτ (see examples in FIG. 39). Thus, the analogy to two dimensional CDMA is seen, where the codewords are 2D complex exponentials that are orthogonal to each other.

From a broader perspective, the Fourier duality relation between the delay-Doppler grid and the time-frequency grid establishes a mathematical link between Radar and communication where the first theory is concerned with maximizing the resolution of separation between reflectors/targets according to their delay-Doppler characteristics and the second is concerned with maximizing the amount of information that can be reliably transmitted through the communication channel composed of these reflectors.

It will be appreciated that the present document provides various technical solutions for the technical problem of co-existence between currently deployed wireless protocols and the OTFS protocol. The OTFS protocol provides significant advantages in wireless communication in terms of transmission efficiency and combating channel imperfections and transceiver movement. While the LTE protocol is used as a specific example, the techniques may be used for co-existence with other legacy protocols, in particular, protocols that are based on OFDM and OFDMA transmission mechanisms, as is described in the present document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of wireless communication, comprising:
generating a number of transmission beams for a first group of user equipment operating using a legacy protocol, and a second group of user equipment operating using orthogonal time frequency space (OTFS) protocol, wherein the legacy protocol comprises a Long Term Evolution (LTE) protocol that uses a modulation scheme comprising an orthogonal frequency division multiplexing (OFDM) scheme; and
transmitting a first group of data packets formatted according to the legacy protocol and using all normal subframes of the LTE protocol to the first group of user equipment and a second group of data packets formatted according to the OTFS protocol and using non-broadcast transmission resources of the LTE protocol to the second group of user equipment, wherein the non-broadcast transmission resources comprise multicast broadcast single frequency network (MBSFN) subframes or almost blank subframes (ABS), and wherein the non-broadcast transmission resources are non-overlapping with control signal transmissions of the LTE protocol,
wherein the transmitting includes:
precoding and modulating the first group of data packets according to the modulation scheme for the legacy protocol; and
precoding and modulating the second group of data packets according to an OTFS modulation scheme that converts the second group of data packets between a time-frequency domain and a delay-Doppler domain and corresponds to an application of a symplectic Fourier transform, two Zak transforms, or a twisted convolution operation.

2. The method of claim 1, wherein the precoding comprises linear precoding.

3. The method of claim 1, wherein the precoding comprises non-linear precoding.

4. The method of claim 1, further including:
transmitting control signals according to the LTE protocol in a control region of the OFDM scheme;
transmitting common reference signals according to the LTE protocol;
transmitting cell discovery signals according to the LTE protocol; and
transmitting system information blocks according to the LTE protocol.

5. The method of claim 1, wherein the signals according to the OTFS protocol are transmitted in symbols 5, 8 and 12 of the LTE protocol using transmission resources as a function of channel reference signal power boosting in the LTE protocol.

6. The method of claim 1, wherein the transmitting the first group of data packets includes refraining from transmitting the first group of data packets using the multicast broadcast single frequency network (MBSFN) subframes of the LTE protocol.

7. The method of claim 1, wherein the transmitting the first group of data packets includes refraining from transmitting the first group of data packets using the almost blank subframes (ABS) of the LTE protocol.

8. The method of claim 1, wherein at least one of the number of transmission beams includes transmissions for only the first group of user equipment operating using the legacy protocol.

9. The method of claim 1, wherein at least one of the number of transmission beams includes transmissions for only the second group of user equipment operating using the OTFS protocol.

10. The method of claim 1, wherein at least one of the number of transmission beams includes transmission for both the first group of user equipment and the second group of user equipment.

11. The method of claim 10, wherein the at least one transmission beam multiplexes transmissions for the first group of user equipment and the second group of user equipment using disjoint time-frequency resources.

12. The method of claim 10, wherein the at least one transmission beam multiplexes transmissions for the first group of user equipment and the second group of user equipment using shared time-frequency resources.

* * * * *